US009253390B2

(12) United States Patent
Tsutsumi

(10) Patent No.: US 9,253,390 B2
(45) Date of Patent: Feb. 2, 2016

(54) IMAGE PROCESSING DEVICE, IMAGE CAPTURING DEVICE, IMAGE PROCESSING METHOD, AND COMPUTER READABLE MEDIUM FOR SETTING A COMBINATION PARAMETER FOR COMBINING A PLURALITY OF IMAGE DATA

(71) Applicant: CANON KABUSHIKI KAISHA, Tokyo (JP)

(72) Inventor: Shohei Tsutsumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 196 days.

(21) Appl. No.: 13/962,107

(22) Filed: Aug. 8, 2013

(65) Prior Publication Data

US 2014/0049666 A1 Feb. 20, 2014

(30) Foreign Application Priority Data

Aug. 14, 2012 (JP) ................................. 2012-179849

(51) Int. Cl.
*H04N 5/232* (2006.01)
*H04N 5/235* (2006.01)
*H04N 5/262* (2006.01)
*H04N 5/225* (2006.01)

(52) U.S. Cl.
CPC ......... *H04N 5/23212* (2013.01); *H04N 5/2356* (2013.01); *H04N 5/23216* (2013.01); *H04N 5/23229* (2013.01); *H04N 5/23293* (2013.01); *G06T 2200/21* (2013.01); *G06T 2207/10052* (2013.01); *H04N 5/2254* (2013.01); *H04N 5/2621* (2013.01)

(58) Field of Classification Search
None
See application file for complete search history.

(56) References Cited

U.S. PATENT DOCUMENTS

| 8,749,620 B1* | 6/2014 | Knight et al. .................... 348/49 |
| 8,811,769 B1* | 8/2014 | Pitts et al. ...................... 382/275 |
| 2007/0098380 A1* | 5/2007 | Spielberg ......................... 396/50 |
| 2008/0131019 A1 | 6/2008 | Ng |
| 2009/0140131 A1* | 6/2009 | Utagawa ....................... 250/226 |

(Continued)

FOREIGN PATENT DOCUMENTS

| CN | 1991440 A | 7/2007 |
| CN | 101800854 A | 8/2010 |

(Continued)

OTHER PUBLICATIONS

Chinese Office Action issued in corresponding application No. 201310354072.1 dated Jan. 16, 2015.

*Primary Examiner* — Justin P Misleh
(74) *Attorney, Agent, or Firm* — Carter, DeLuca, Farrell & Schmidt, LLP

(57) ABSTRACT

It is inconvenient for a user that a UI for inputting a virtual focus position at the time of refocus and a UI for inputting a focus position at the time of image capturing exist separately from and independently of each other. An image processing device comprising a generation unit configured to generate combined image data obtained in a case of capturing an image with a second set value different from a first set value used in capturing an image with an image capturing device by using a plurality of pieces of captured image data obtained by the image capturing device, wherein the image capturing device is capable of capturing image data from a plurality of viewpoint positions and includes an operation unit for setting a set value of an image capturing parameter, and wherein the first and second set values are set via the operation unit.

11 Claims, 27 Drawing Sheets

(56) References Cited

U.S. PATENT DOCUMENTS

| | | |
|---|---|---|
| 2011/0129165 A1 | 6/2011 | Lim et al. |
| 2012/0002071 A1* | 1/2012 | Nishiyama ............ H04N 5/238 348/222.1 |
| 2012/0154651 A1* | 6/2012 | Ohno ................... H04N 5/2254 348/294 |
| 2012/0287329 A1* | 11/2012 | Yahata ...................... G06T 5/50 348/345 |
| 2012/0287331 A1* | 11/2012 | Iwane ........................... 348/360 |
| 2012/0307099 A1* | 12/2012 | Yahata ...................... G06T 5/50 348/222.1 |

FOREIGN PATENT DOCUMENTS

| | | |
|---|---|---|
| JP | 2009-124213 | 6/2009 |
| WO | 2008-050904 A1 | 5/2008 |

* cited by examiner

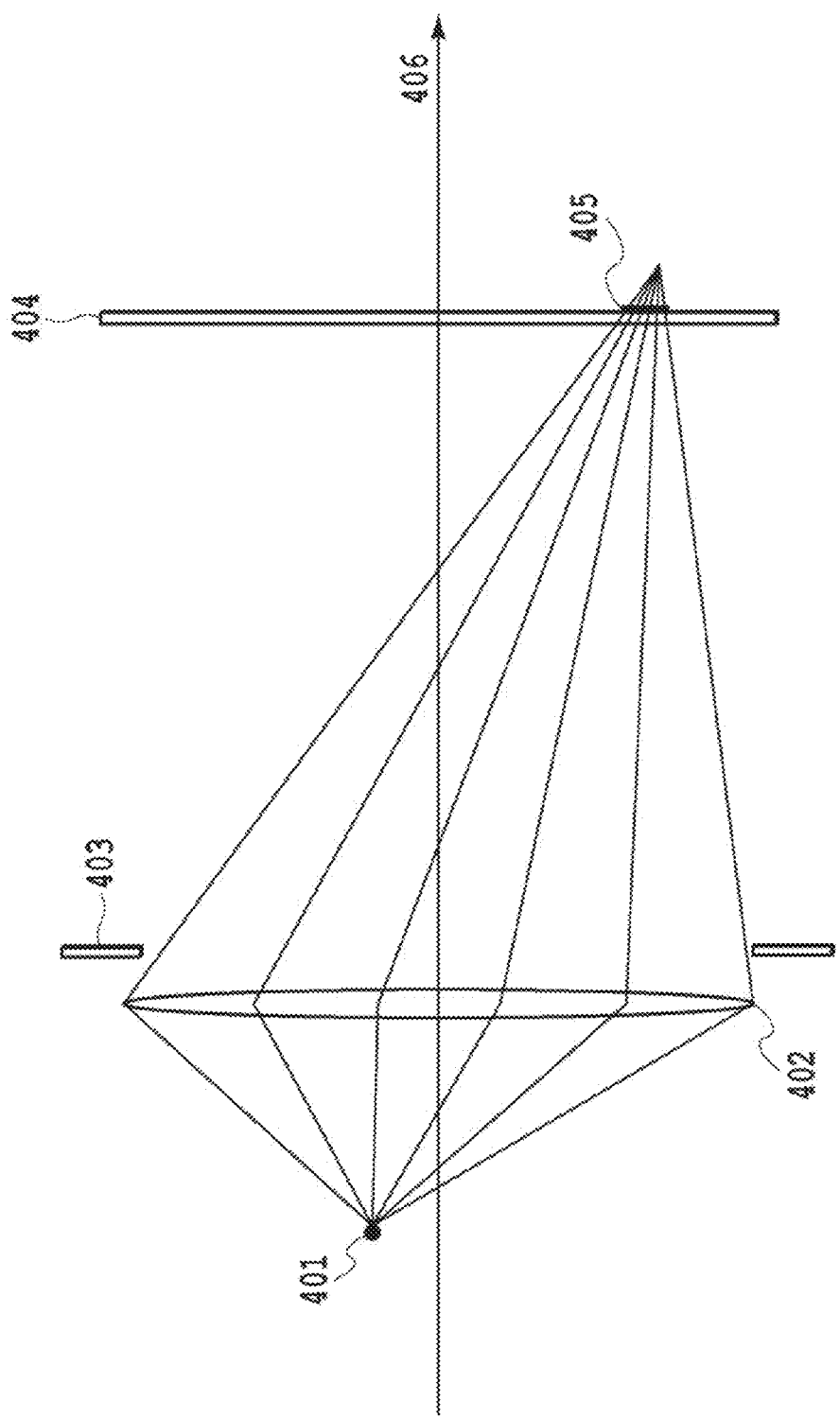

| PIXEL POSITION OF COMBINED IMAGE | TYPE OF COLOR | PIXEL VALUE |
|---|---|---|
| ⋮ | ⋮ | ⋮ |
| (10,9) | B | 21 |
| (10,10) | R | 24 |
| (10,10) | R | 26 |
| (10,10) | G | 32 |
| (10,10) | G | 34 |
| (10,10) | B | 22 |
| (10,11) | R | 25 |
| ⋮ | ⋮ | ⋮ |

1201: rows (10,10) R 24 and (10,10) R 26
1202: rows (10,10) G 32 and (10,10) G 34
1203: row (10,10) B 22

FIG.12

| VIRTUAL FOCUS POSITION | VIRTUAL f-stop | VIRTUAL ZOOM MAGNIFICATION |
|---|---|---|
| -100 μm | F2.8 | 0.5 |
| -95 μm | F2.8 | 0.5 |
| ⋮ | ⋮ | ⋮ |
| 95 μm | F2.8 | 0.5 |
| 100 μm | F2.8 | 0.5 |
| -100 μm | F4 | 0.5 |
| ⋮ | ⋮ | ⋮ |
| 100 μm | F22 | 0.5 |
| -100 μm | F2.8 | 0.6 |
| ⋮ | ⋮ | ⋮ |
| 100 μm | F22 | 0.6 |
| ⋮ | ⋮ | ⋮ |
| 100 μm | F22 | 2 |

FIG.17

IMAGE PROCESSING DEVICE, IMAGE CAPTURING DEVICE, IMAGE PROCESSING METHOD, AND COMPUTER READABLE MEDIUM FOR SETTING A COMBINATION PARAMETER FOR COMBINING A PLURALITY OF IMAGE DATA

BACKGROUND OF THE INVENTION

1. Field of the Invention

The present invention relates to a parameter setting method.

2. Description of the Related Art

Conventionally, in the case where an image was captured by a camera out of focus, it was necessary to recapture the image after performing focusing again. Further, in the case where it was desired to obtain focused images of a plurality of subjects the depths of which are different, it was necessary to capture the image of each subject in focus a plurality of times.

In recent years, a technique called light field photography has been developed, which is capable of adjusting the focus position in the later image processing (refocus) by adding a new optical element to the optical system to acquire images from multiple viewpoints (a plurality of viewpoints).

With this technique, there is an advantage that a failure in focusing at the time of image capturing can be made up by image processing because it is possible to perform focusing after image capturing. Further, there is also an advantage that it is possible to obtain a plurality of images focused on arbitrary subjects in an image from one captured image by changing the image processing method, and therefore, it is possible to reduce the number of times of image capturing.

In light field photography, the direction and intensity of a light beam that passes through each position (light field, hereinafter, referred to as "LF") in a plurality of positions in the space are calculated from multi-viewpoint captured image data. Then, by using the information of the acquired LF, an image on the assumption that light passes through a virtual optical system and forms the image on a virtual sensor is calculated. By appropriately setting such a virtual optical system and a virtual sensor, refocus described previously is also enabled. As an image capturing device for acquiring LF, a Plenoptic Camera (for example, Japanese Patent Laid-Open No. 2009-124213) in which a microlens array is arranged behind a main lens, and a camera array in which compact cameras (image capturing modules) are arranged side by side are known. It is possible for both to obtain multi-viewpoint captured image data in which the image of a subject is captured in different directions by one-time image capturing. It is also possible to represent light field photography as calculation of an image acquired by a virtual sensor under virtual optical conditions from multi-viewpoint captured image data. In the following, processing to calculate an image acquired by a virtual sensor is referred to as "refocus processing". As refocus processing, there is known a method in which acquired multi-viewpoint captured image data is subjected to projective transformation onto a virtual sensor, and added and averaged (for example, WO 2008/050904 pamphlet).

As a method for displaying an image having been subjected to refocus processing (hereinafter, refocus image) while changing the focus position, for example, there is a method disclosed in US 2008/0131019 A1. In this method, a user interface (UI) via which the focus position is adjusted is provided on the screen on which the refocus image is displayed and a user changes the focus position via the UI. Further, in US 2008/0131019 A1, there is disclosed a method for displaying a refocus image whose focus position has been adjusted to a subject specified by a user who desires to put the subject into focus on the screen on which the refocus image is displayed.

In the method disclosed in the above US 2008/0131019 A1, the UI for adjusting a virtual focus position used at the time of refocusing and the UI for adjusting the focus position used at the time of image capturing are different. The UI for inputting a virtual focus position at the time of refocusing and the UI for inputting the focus position at the time of image capturing exist separately from and independently of each other as described above, and therefore, it is inconvenient for a user to use them.

SUMMARY OF THE INVENTION

An image processing device according to the present invention includes a generation unit configured to generate combined image data obtained in a case of capturing an image with a second set value different from a first set value used in capturing an image with an image capturing device by using a plurality of pieces of captured image data obtained by the image capturing device, wherein the image capturing device is capable of capturing image data from a plurality of viewpoint positions and includes an operation unit for setting a set value of an image capturing parameter, and wherein the first and second set values are set via the operation unit.

According to the present invention, it is made possible for a user to set a parameter at the time of image combination, etc., in the same manner as that at the time of image capturing, and therefore, it is possible to realize a UI for inputting a parameter, easy-to-use for a user.

Further features of the present invention will become apparent from the following description of exemplary embodiments (with reference to the attached drawings).

BRIEF DESCRIPTION OF THE DRAWINGS

FIG. 4 is a diagram showing a configuration of a normal image capturing optical system;

FIG. 12 is an example of intermediate data stored in a memory unit;

FIG. 17 is an example of a table putting together image combination parameters;

DESCRIPTION OF THE EMBODIMENTS

First Embodiment

Figure 1:
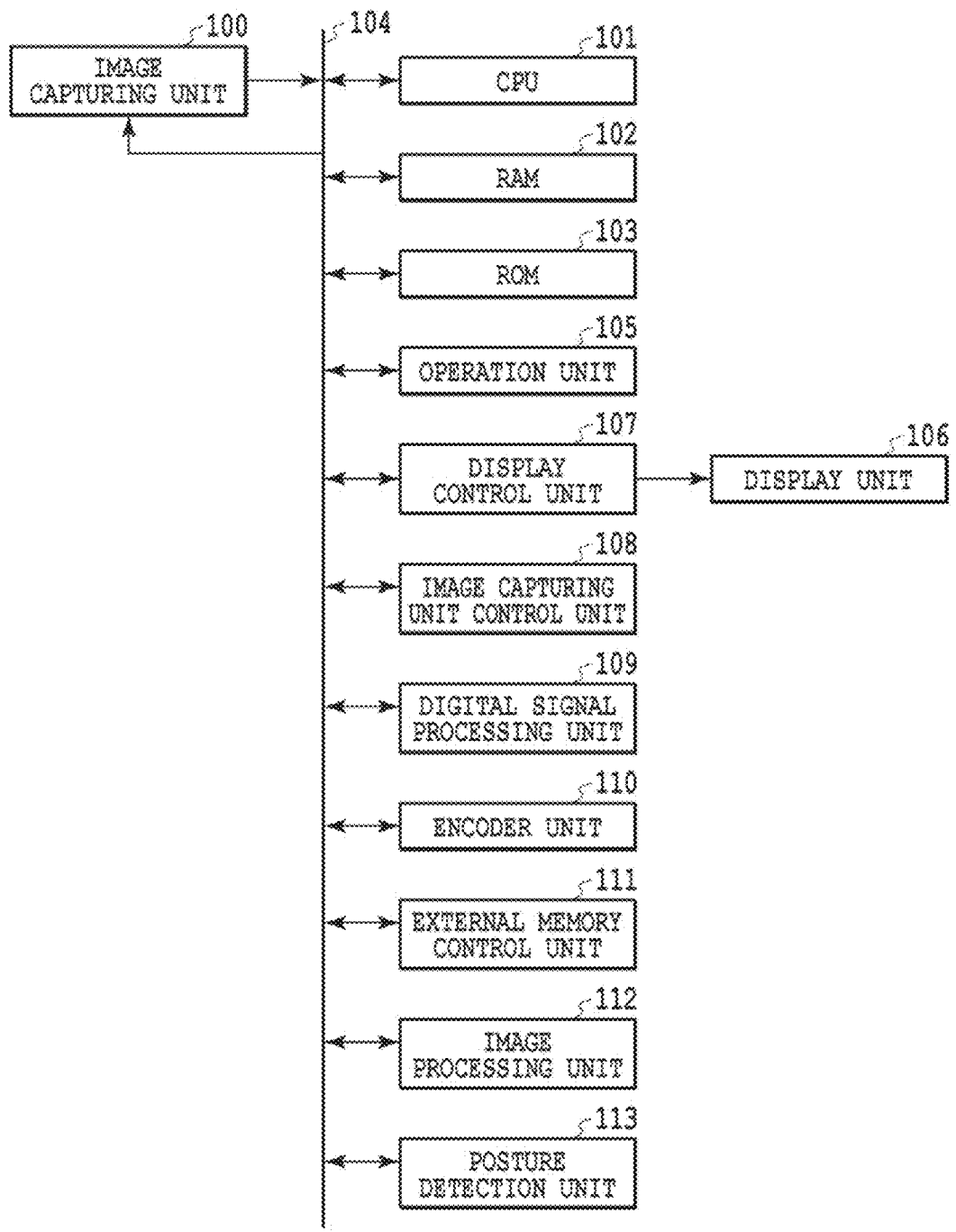
FIG. 1 is a block diagram showing an internal configuration of an image capturing device.

FIG. 1 is a block diagram showing an internal configuration of an image capturing device according to the present first embodiment.

An image capturing unit 100 receives information of light of a subject by an image capturing element and acquires color captured image data (digital data) by A/D converting the received signal. Details of the image capturing unit 100 will be described later.

A central processing unit (CPU) 101 totally controls each unit described below.

A RAM 102 functions as a main memory, a work area, etc., of the CPU 101.

A ROM 103 stores control programs, etc., executed by the CPU 101.

A bus 104 is a transfer path of various kinds of data and, for example, digital captured image data acquired by the image capturing unit 100 is transferred to a predetermined processing unit via the bus 104.

An operation unit 105 configured to receive instructions of a user includes buttons, mode dial, etc. Details of the operation unit will be described later.

As a display unit 106 configured to display captured images and characters, for example, a liquid crystal display is used. The display unit 106 may have a touch screen function and in such a case, it is also possible to handle user's instructions using the touch screen as an input to the operation unit 105.

A display control unit 107 performs display control of captured images and characters displayed on the display unit 106.

An image capturing unit control unit 108 performs control of an image capturing system based on instructions from the CPU 101, such as focusing, shutter releasing and closing, and aperture adjustment.

A digital signal processing unit 109 performs various kinds of processing, such as white balance processing, gamma processing, and noise reduction processing, on the digital data received via the bus 104.

An encoder unit 110 performs processing to convert digital data into a file format, such as JPEG and MPEG.

An external memory control unit 111 is an interface to connect to a PC or other media (for example, hard disk, memory card, CF card, SD card, USB memory).

An image processing unit 112 performs image combination processing, such as refocus processing, from the color captured image data acquired by the image capturing unit 100 or the color captured image data output from the digital signal processing unit 109. Details of the image processing unit 112 will be described later. The image processing unit 112 may be realized also as an image processing device independent from the image capturing unit.

A posture detection unit 113 detects the posture of the image capturing device (image capturing unit 100) that changes at the time of image capturing by using a gyro sensor, etc. The detection result of the posture detection unit 113 is utilized in a third embodiment.

An image capturing device includes components other than those described above, but they are not the main purpose of the present embodiment, and therefore, explanation thereof is omitted.

Figure 2:
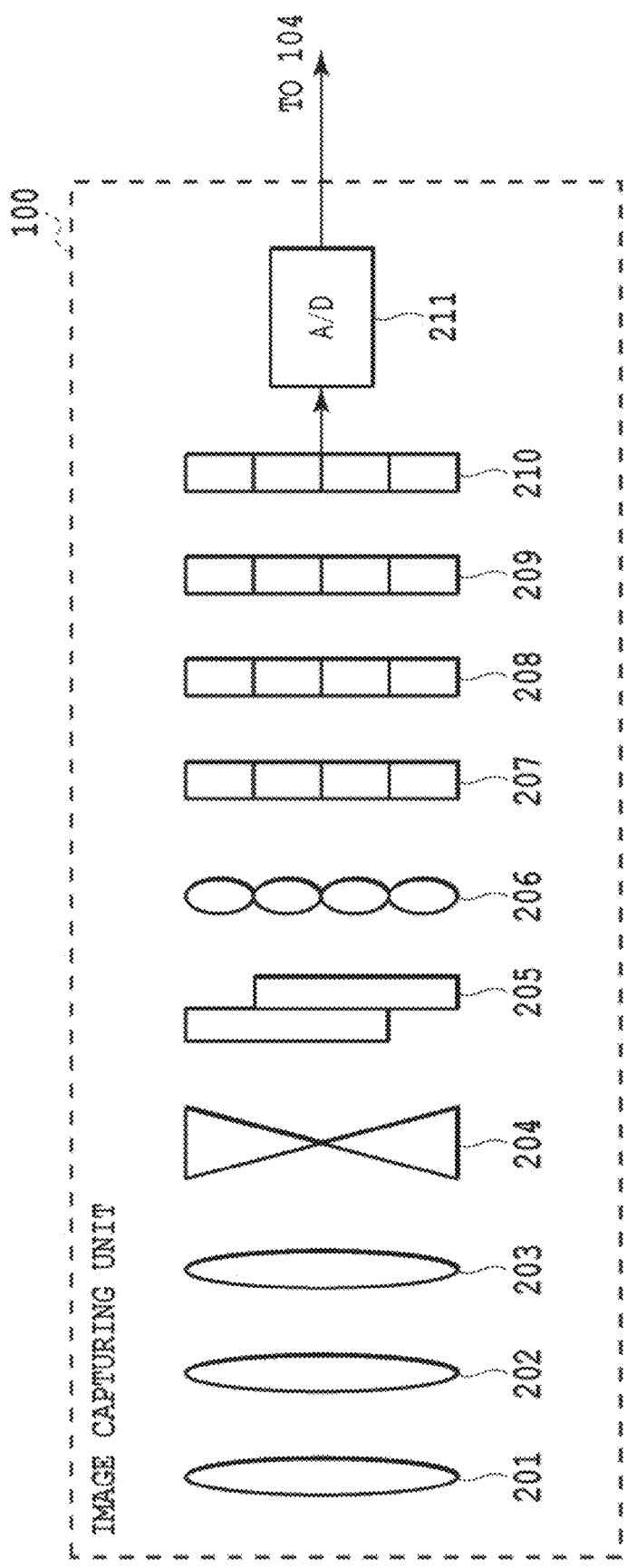
FIG. 2 is a diagram showing an internal configuration of an image capturing unit.

FIG. 2 is a diagram showing an internal configuration of the image capturing unit 100.

The image capturing unit 100 includes image capturing lenses 201 to 203, an aperture 204, a shutter 205, a microlens array 206, an optical low-pass filter 207, an iR cut filter 208, a color filter 209, an image capturing element (hereinafter, sensor) 210 configured to perform photoelectric conversion, and an A/D conversion unit 211. The image capturing lenses 201 to 203 are the zoom lens 201, the focus lens 202, and the camera shake correction lens 203, respectively. By adjusting the aperture, the amount of light incident on the image capturing unit 100 can be adjusted. Here, even if the size of each lens is in units of micrometers or millimeters, the term "microlens" is used regardless of the size of each lens.

Figure 3A:
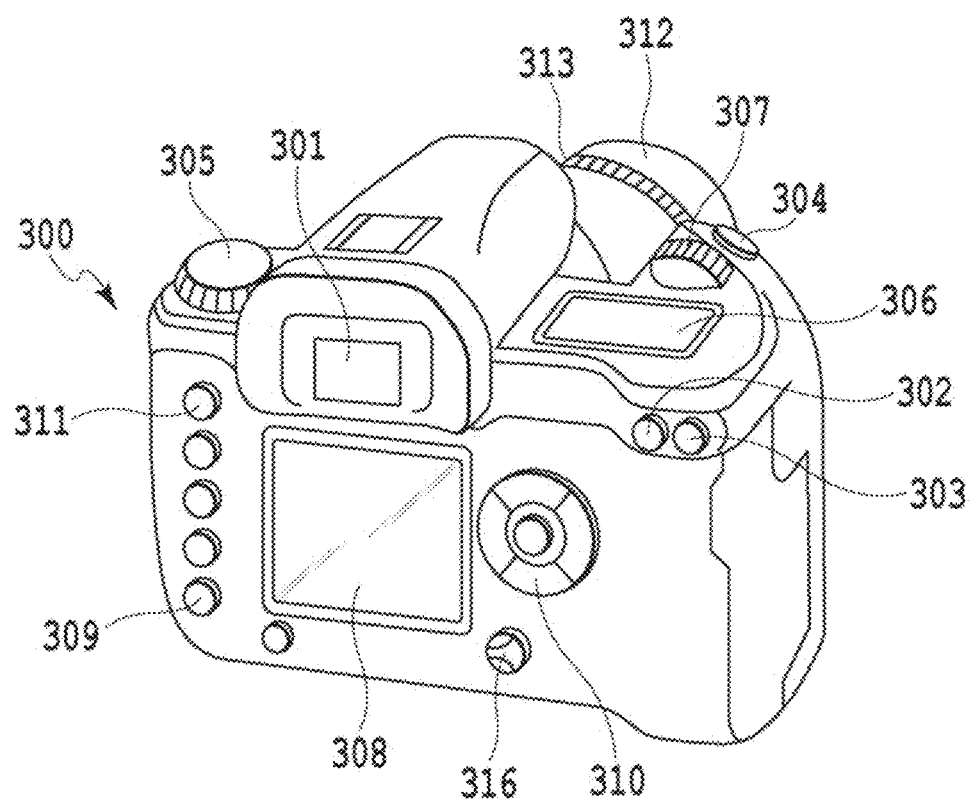
FIG. 3A is a diagram showing an external appearance of an image capturing device and FIG. 3B is a diagram showing a side surface of an image capturing lens barrel.

FIG. 3A is a diagram showing an external appearance of an image capturing device according to the present embodiment. On the top of a body 300 of the image capturing device, there are an automatic exposure (AE) lock button 302, a button 303 to select a range-finding point of automatic focusing (AE), and a release button 304 for the image capturing operation as the operation unit 105, in addition to an eyepiece window 301 of a view finder. Further, there are an image capturing mode selection dial 305, an external display unit 306, an electronic dial 307, etc. The electronic dial 307 is a multi-functional signal input unit configured to input a numerical value to the camera together with the use of another operation button and to switch the image capturing modes. On the external display unit 306 of the liquid crystal display, image capturing conditions, such as shutter speed, aperture, and image capturing mode, and other information are displayed. At the rear surface of the body 300 of the image capturing device, there are a liquid crystal monitor 308 to display captured images, combined images generated from captured images, various kinds of setting screens, etc., a switch 309 to turn on and off the display on the liquid crystal monitor 308, a cross key 310, a menu button 311, etc. An image capturing lens barrel 312 is located at the front surface of the body 300 of the image capturing device, and with rotation of a zoom adjustment ring 313, the zoom lens 201 is driven to adjust the viewing angle (zoom magnification). An image capturing/reproduction switch button 316 is a button to switch between the image capturing mode to capture an image and the reproduction mode to display an image. In the reproduction mode, it is possible to perform refocus processing, to be described later, on an image (captured image) captured in the image capturing mode and to display the image.

Figure 3B:
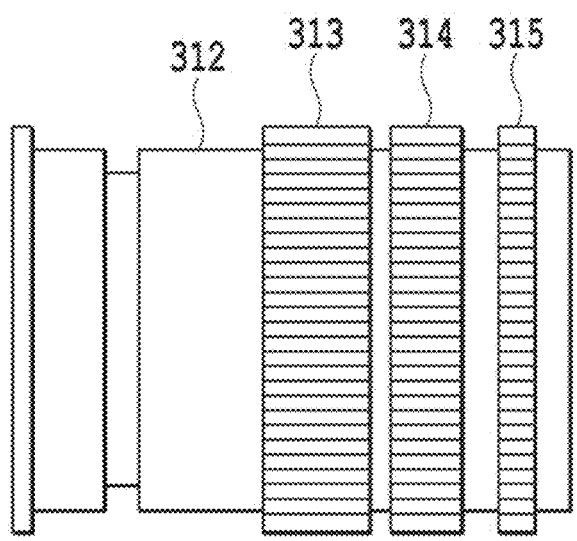

FIG. 3B is a diagram showing a side surface of the image capturing lens barrel 312. The lens barrel 312 includes a focus adjustment ring 314 and an aperture adjustment ring 315, in addition to the zoom adjustment ring 313. With rotation of the focus adjustment ring 314, the focus lens 202 is driven and the focus position at the time of image capturing is adjusted. With rotation of the aperture adjustment ring 315, the aperture ratio of the aperture 204 is adjusted to adjust the f-stop at the time of image capturing. That is, various kinds of image capturing parameters (focus position, f-stop, zoom magnification, etc.) applied at the time of image capturing are set by various kinds of adjustment rings, which are part of the operation unit 105.

Although details are described later, these various kinds of adjustment rings are also used in setting the image combination parameters (virtual focus position, etc.) used for image combination processing after image capturing.

<Principles of Refocus>

FIG. 4 is a diagram showing a configuration of a normal image capturing optical system, representing an out-of-focus state. In FIG. 4, for simplification of explanation, the configurations of the shutter, the optical low-pass filter, the iR cut filter, the color filter, the zoom lens, etc., are omitted. Further, as to the lens configuration, the lens group is represented by a main lens 402. Light from an object point 401 is collected by the main lens 402 and reaches a partial region 405 of a sensor 404. The light collected by the main lens 402 reaches the sensor 404 before forming an image at one point, and therefore, in the partial region 405 of the sensor 404, the light from the object point 401 is recorded in the spread state, resulting in a blurred image with a low level of sharpness. In the case where it is desired to obtain an image with a high level of sharpness, it is necessary to capture an image again after adjusting the focus position so that the image of the object point 401 is formed at one point on the sensor 404.

Figure 5:
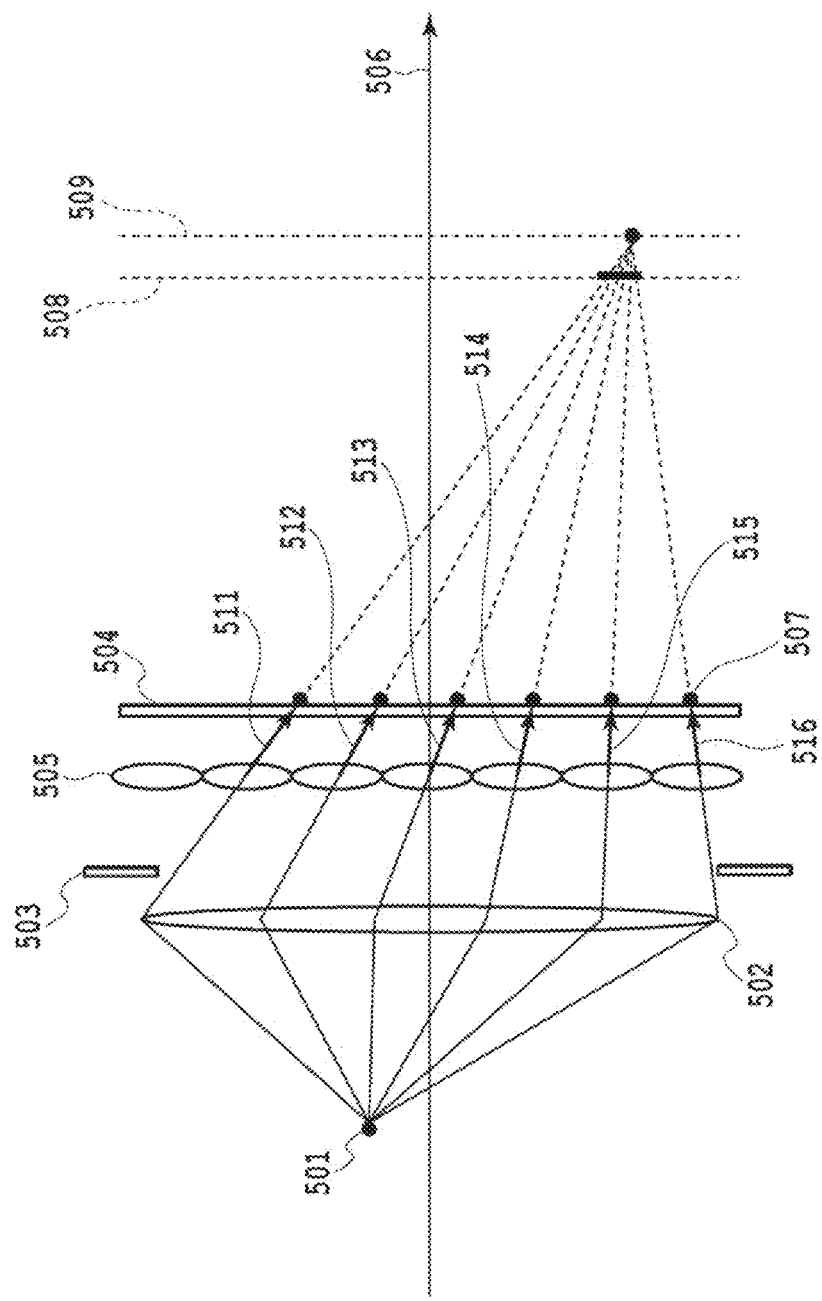
FIG. 5 is a diagram showing a configuration of an image capturing unit in association with the normal image capturing optical system.

FIG. 5 is a diagram showing the configuration of the image capturing unit 100 shown in FIG. 2 in association with the normal image capturing optical system shown in FIG. 4. In FIG. 5, a microlens array 505 corresponding to the microlens array 206 in FIG. 2 is added and the position of a sensor 504 is changed to a position closer to a main lens 502. In FIG. 5, light emitted from an object point 501 is collected by the main lens 502, and then, passes through the microlens array 505 before forming an image, and is recorded by the sensor 504. At this time, the light emitted from the object point 501 is recorded as values in accordance with the direction and the intensity of the light beam at a plurality of pixel positions on the sensor 504. That is, optical images formed on the sensor (on the image capturing element) generated by one microlens are images of the object point 501 observed from different directions, and therefore, on the sensor 504, a multi-viewpoint image is recorded as one image.

In the refocus processing, the image recorded on the virtual sensor (refocus image) can be obtained by calculation by extending the light beam group and calculating the intensity of the light at the virtual sensor position. In the case where the image recorded at the position of a virtual sensor A (508) is calculated, the light from the object point 501 is spread and a blurred image is obtained. On the other hand, in the case where the image recorded at the position of a virtual sensor B (509) is calculated, the light from the object point 501 converges on one point and an image in focus is obtained. The processing to acquire the image recorded at the virtual sensor position by calculation by adjusting the position of the virtual sensor as described above corresponds to the action to adjust the focus position in the normal optical system.

Further, in calculating the image recorded at the position of the virtual sensor B (509), instead of using all the light emitted from the object point 501 for the calculation of the refocus processing, light is selected according to the position of the main lens 502 (or the aperture 503) where the light passes through. Due to this, it is possible to calculate an image in the case where the aperture ratio (f-stop) of the aperture 503 is changed virtually. For example, by using only the light passing through the part in the vicinity of the center of the main lens 502 for the calculation of the refocus processing, it is possible to obtain an image by calculation in the state where the aperture 503 is stopped down. For example, by selecting a light beam B (512), a light beam C (513), a light beam D (514), and a light beam E (515), it is possible to generate a refocus image in the state where the aperture 503 is stopped down.

In contrast, in the case where it is desired to obtain a refocus image in the state where the aperture 503 is opened up, it is sufficient to use all the light beams passing through the main lens 502 for the calculation of the refocus processing. For example, the light beams from a light beam A (511) to a light beam F (516) are used for the calculation of the refocus processing. The relationship between the virtual aperture ratio of the aperture and light beams used at the time of the refocus processing will be described later.

As described above, by selecting light beams to be used for the refocus processing, it is possible to obtain an image by calculation in the state equivalent to the state where the aperture is stopped down physically. That is, it is made possible to virtually adjust the depth of field after image capturing.

As shown in FIG. 5, in order to obtain images of the object point 501 observed from a larger number of different directions, it is preferable to capture the image in the state where the aperture 503 included in the image capturing unit 100 is opened up as much as possible.

The above is the principles of the refocus processing to obtain an image by calculation whose focus position and depth of field are adjusted after image capturing.

<Configuration Diagram of Image Processing Unit>

Figure 6:
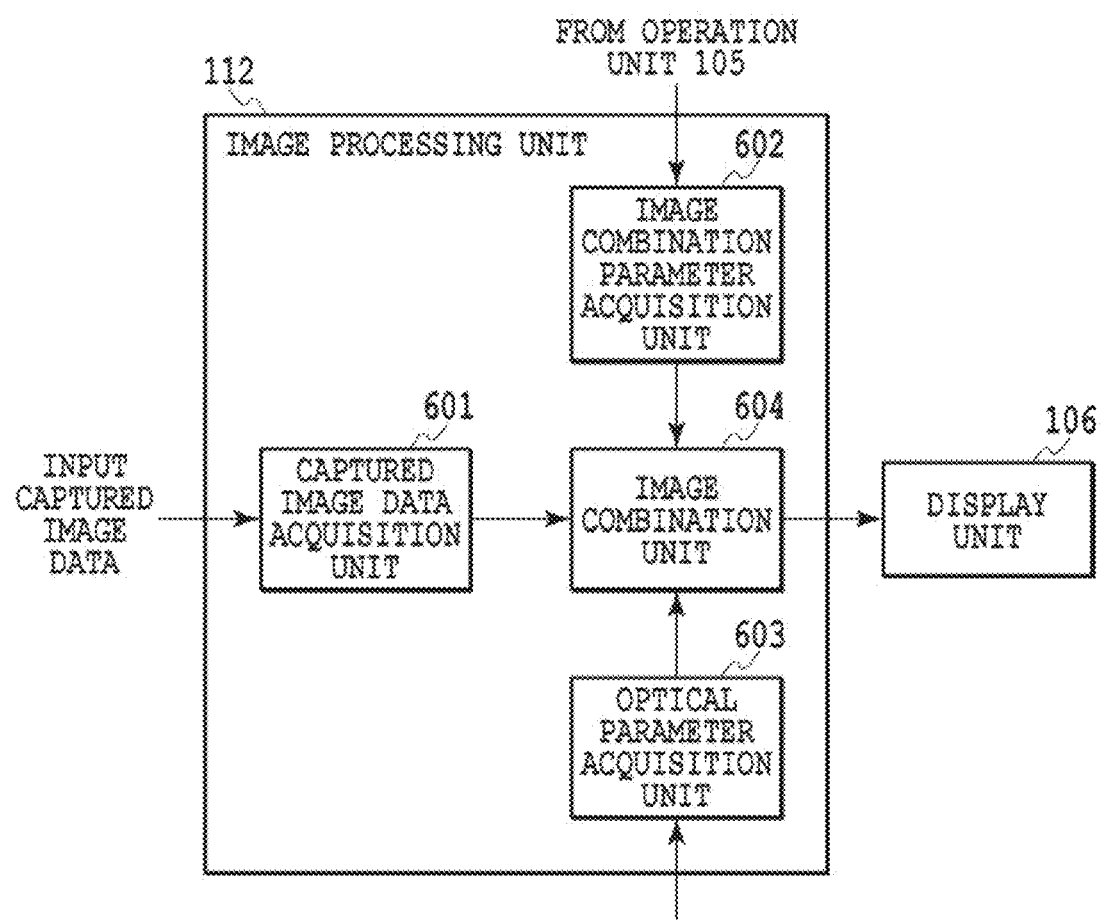
FIG. 6 is a block diagram showing an internal configuration of an image processing unit according to a first embodiment.

FIG. 6 is a block diagram showing an internal configuration of the image processing unit 112.

A captured image data acquisition unit 601 acquires color captured image data (input captured image data) supplied from the image capturing unit 100 via the bus 104.

An image combination parameter acquisition unit 602 acquires image combination parameters necessary for the processing in an image combination unit 604. The image combination parameters are various kinds of parameters used in the image combination processing and refer to, for example, the virtual focus position, the virtual f-stop, the virtual zoom magnification, etc. In this case, after the mode is switched to the reproduction mode by pressing down of the image capturing/reproduction switch button 316 described previously, the operation of the various kinds of adjustment rings performed after the switching is handled as the operation for the setting of the image combination parameters.

An optical parameter acquisition unit 603 acquires optical parameters of the image capturing unit 100 necessary for the processing in the image combination unit 604. The optical parameters are various kinds of physically fixed parameters of the optical system and refer to, for example, the optical center position of the microlens, a distance σ real between the microlens and the sensor, etc.

The image combination unit 604 generates a combined image in accordance with the above-described image combination parameters based on the captured image data acquired by the captured image data acquisition unit 601 and the optical parameters. The data of the generated combined image is output to the display unit 106.

Figure 7:
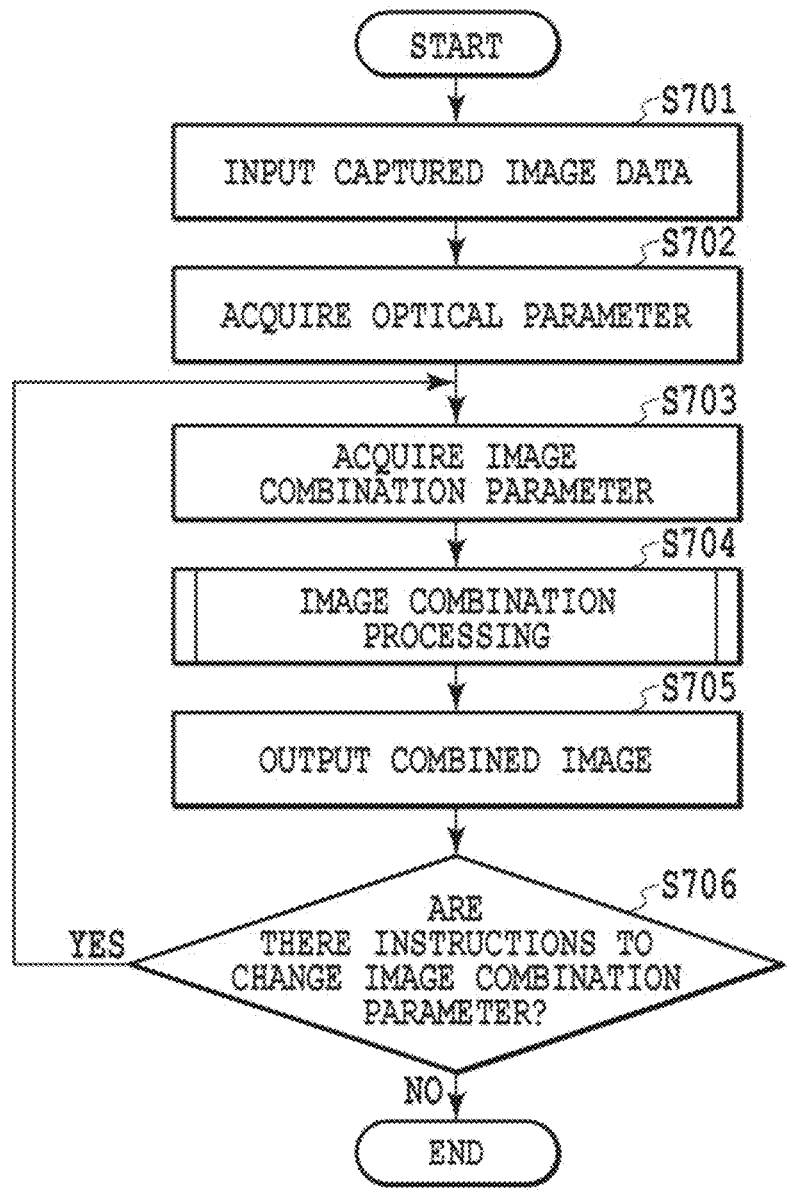
FIG. 7 is a flowchart showing a flow of image processing in the image processing unit according to the first embodiment.

FIG. 7 is a flowchart showing a flow of image processing in the image processing unit 112 according to the present embodiment. The series of pieces of processing is performed by the CPU 101 executing a computer-executable program in which a procedure to be shown below is described after reading the program from the ROM 103 onto the RAM 102.

After the image capturing mode is switched to the reproduction mode by pressing down of the image capturing/reproduction switch button 316, the captured image data acquisition unit 601 acquires captured image data recorded by the image capturing unit 100 at step 701. As described above, it is preferable that captured image data to be subjected to image combination processing is captured in the state where the f-stop (F number) is set to a small value (for example, F2.8) (the state where the aperture is fully opened up). The captured image data acquired here also includes the image capturing parameters, such as the focus position, the f-stop, and the zoom magnification, at the time of image capturing.

At step 702, the optical parameter acquisition unit 603 acquires the above-described optical parameters.

At step 703, the image combination parameter acquisition unit 602 acquires the above-described image combination parameters. Specifically, the image combination parameter acquisition unit 602 acquires input values in accordance with the amount of operation of the various kinds of adjustment rings (here, the focus adjustment ring 314, the aperture adjustment ring 315, the zoom adjustment ring 313) used for the setting of the image capturing parameters at the time of image capturing. For example, a user rotates the focus adjustment ring 314 in a predetermined direction by an arbitrary amount, and thereby the value corresponding to the amount of rotation is acquired and set as the input value at the virtual focus position. This also applies to the virtual f-stop. The virtual zoom magnification is obtained by the comparison between the input value (viewing angle=lens focal length) obtained via the zoom adjustment ring 313 and the zoom magnification (viewing angle) at the time of image capturing. For example, a case is assumed where the lens focal length is set to 50 mm in the image capturing mode and set to 75 mm in the reproduction mode by the zoom adjustment ring 313. In this case, the virtual zoom magnification is 1.5 times that at the time of image capturing (the viewing angle of the generated image becomes narrower than that at the time of image capturing). As described above, in the present embodiment, it is possible for a user to set the image combination parameters via the various kinds of adjustment rings used at the time of image capturing.

At step 704, the image combination unit 604 performs image combination processing on the captured image data using the image combination parameters supplied from the image combination parameter acquisition unit 602 and the optical parameters supplied from the optical parameter acquisition unit 603. Details of the image combination processing will be described later.

At step 705, the image combination unit 604 outputs the generated combined image data to the display unit 106 and the combined image is displayed on the display unit 106.

At step 706, the image processing unit 112 determines whether or not there are instructions to change the image combination parameters (operation of various kinds of operation rings by a user). In the case where it is determined that there are instructions to change the image combination parameters, the procedure returns to step 703. Then, image combination processing in accordance with the image combination parameters after the change is performed and a new combined image is displayed (steps 704, 705). On the other hand, in the case where it is determined that there are not instructions to change the image combination parameters, this processing is exited.

<Image Combination Processing>

Next, details of the image combination unit 604 within the image processing unit 112 are explained.

Figure 8:
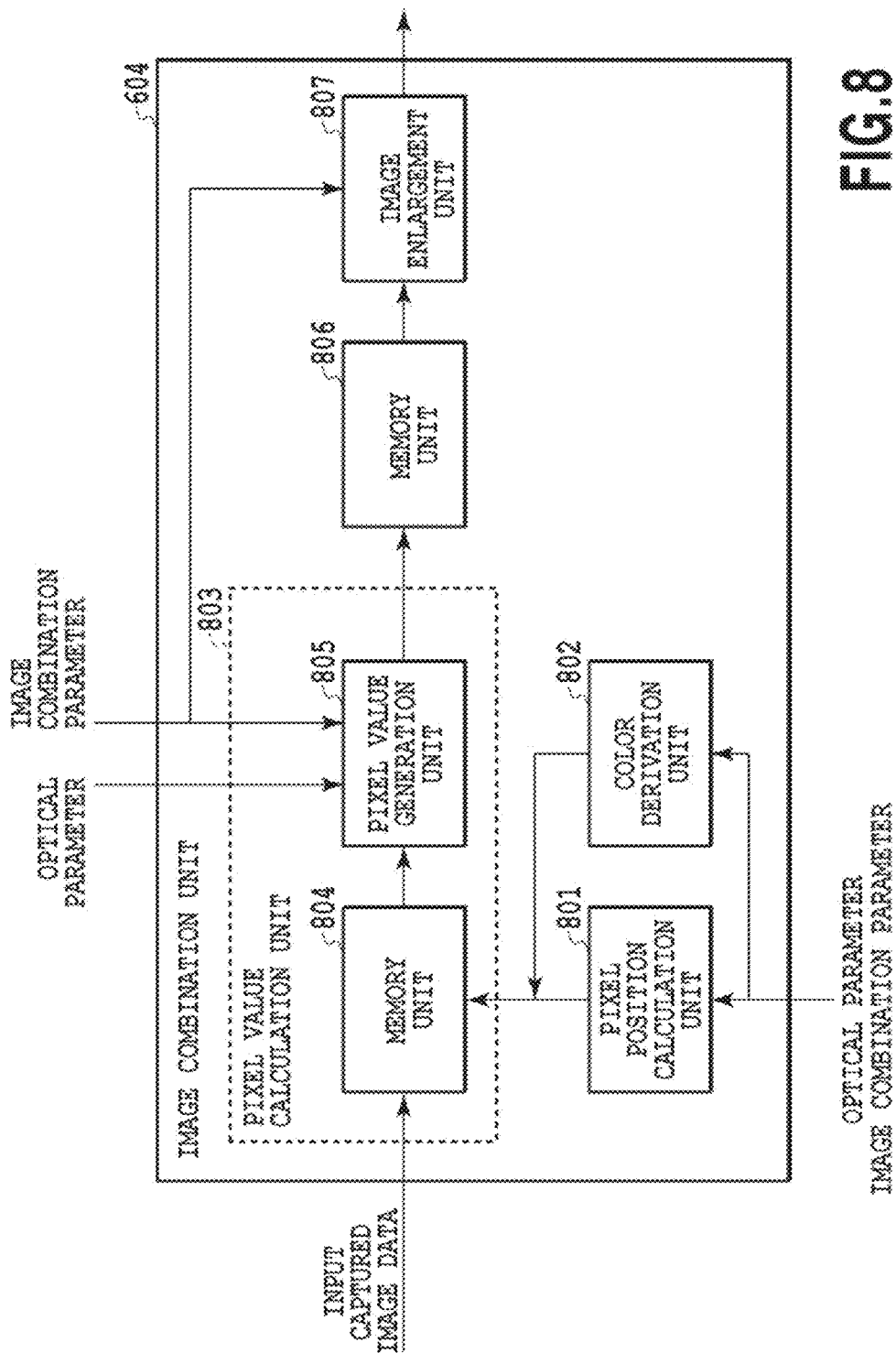
FIG. 8 is a diagram showing an internal configuration of an image combination unit.

FIG. 8 is a diagram showing an internal configuration of the image combination unit 604.

The image combination unit 604 includes a pixel position calculation unit 801, a color derivation unit 802, a pixel value calculation unit 803, a memory unit 806, and an image enlargement unit 807, and further, the pixel value calculation unit 803 includes a memory unit 804 and a pixel value generation unit 805.

The image combination unit 604 calculates a pixel value of a combined image from captured image data (digital value) sent sequentially from the captured image data acquisition unit 601 using each unit described above, and performs processing to sequentially output pixel values in order of completion of calculation. Detailed explanation is given below.

Figure 9:
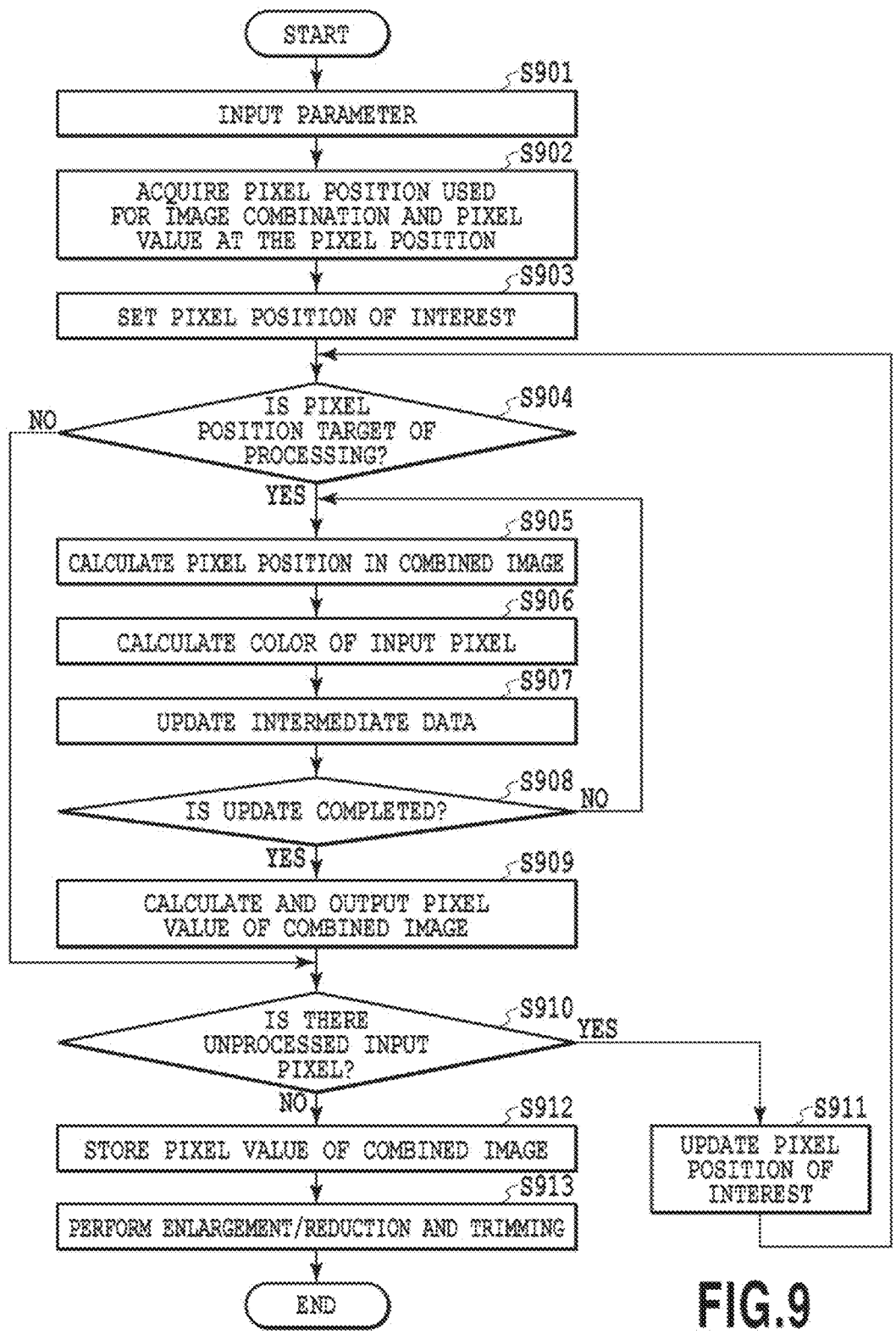
FIG. 9 is a flowchart showing a flow of image combination processing in the image combination unit according to the first embodiment.

FIG. 9 is a flowchart showing a flow of image combination processing in the image combination unit 604 according to the present embodiment. In order to simplify explanation, explanation is given on the assumption that the captured image data (input captured image data) of the digital value supplied from the captured image data acquisition unit 601 is one-dimensional data.

At step 901, the pixel position calculation unit 801 acquires image combination parameters and optical parameters from a bus (not shown schematically). The acquisition of image combination parameters is as described above. The optical parameters are acquired by reading those retained in the RAM 102, etc., in advance.

At step 902, the pixel value calculation unit 803 acquires pixel positions and pixel values used for image combination in the input captured image data. Pixel positions used for image combination are acquired from the image combination parameters acquired at step 901 by referring to the virtual f-stop.

Figure 10A:
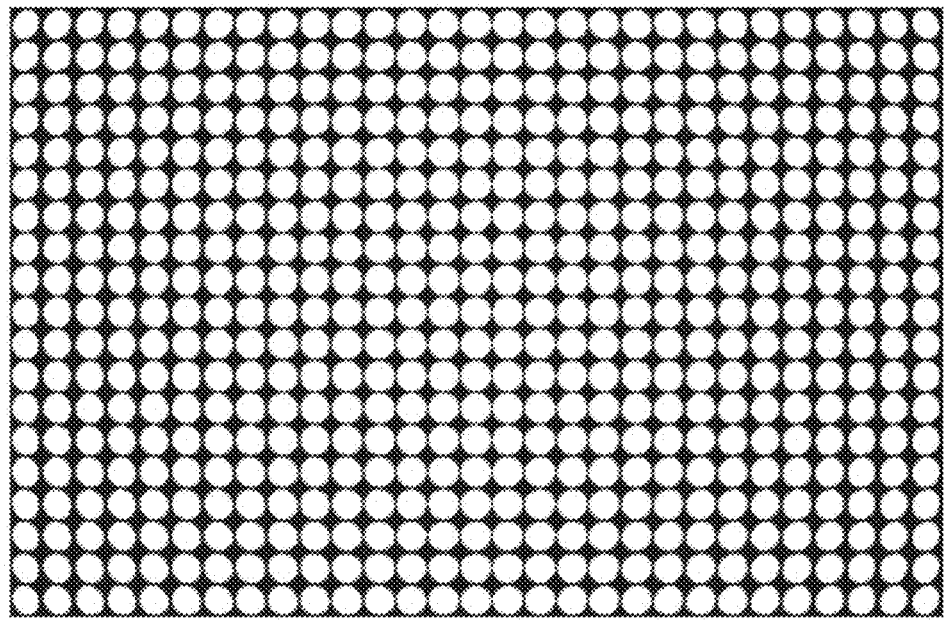
FIGS. 10A and 10B are diagrams showing an example of pixel positions used for image combination.
Figure 10B:
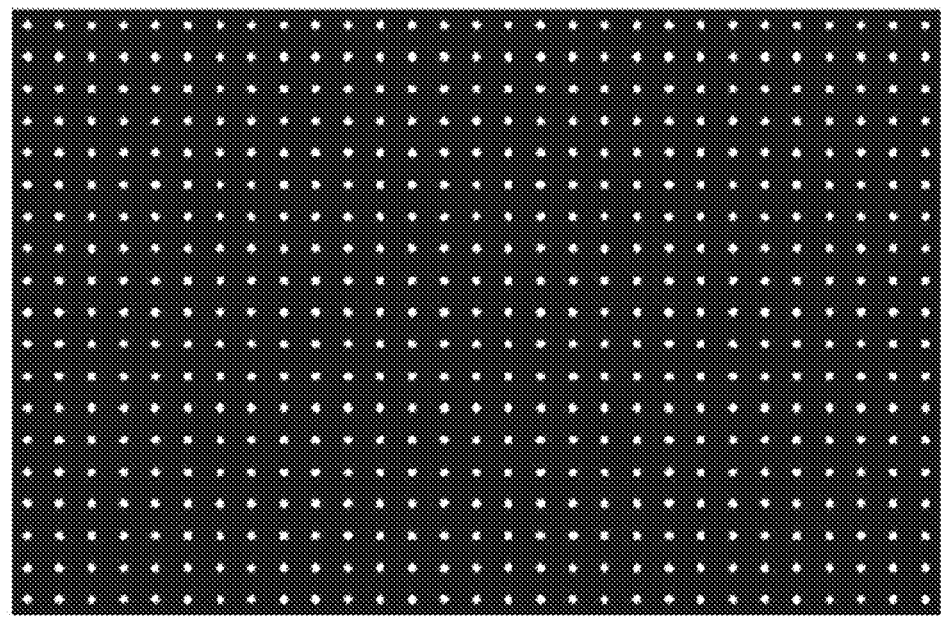

FIGS. 10A and 10B are diagrams showing an example of pixel positions used for image combination. Parts shown in white in the diagram are pixel positions used for image combination and in contrast, parts shown in black are pixel positions not used for image combination. FIG. 10A shows pixel positions in the case where the virtual f-stop is set to F2.8 and FIG. 10B shows pixel positions in the case where the virtual f-stop is set to F11, respectively. In this manner, pixel positions corresponding to a plurality of f-stops in a range that the aperture adjustment ring 315 can adjust are retained in the RAM 102, etc., in advance. By referring to the retained information, the pixel value calculation unit 803 acquires pixel positions in accordance with the acquired virtual f-stop and acquires pixel values in the captured image data corresponding to the acquired pixel positions.

Explanation is returned to the flowchart in FIG. 9.

At step 903, the pixel value calculation unit 803 sets an initial value of a pixel position of interest. For example, the pixel at the top-left end of the captured image is set as the first pixel of interest.

At step 904, the pixel value calculation unit 803 determines whether the pixel position of the set pixel of interest is the pixel position used for image combination. Determination of whether the pixel position is used for image combination is performed by, for example, comparing the pixel position with a table (table indicating pixels in the white parts representing pixel positions that are used by 1 and pixels in the black parts representing pixel positions that are not used by 0) indicating the pixel positions acquired at step 902, etc. In the case where it is determined that the pixel position of the pixel of interest is the pixel position (corresponding to the white part) used for image combination, the procedure proceeds to step 905. On the other hand, in the case where it is determined that the pixel position of the pixel of interest is the pixel position (corresponding to the black part) not used for image combination, the procedure proceeds to step 910.

At step 905, the pixel position calculation unit 801 calculates the pixel position in the combined image of each pixel of the input captured image data.

Figure 11:
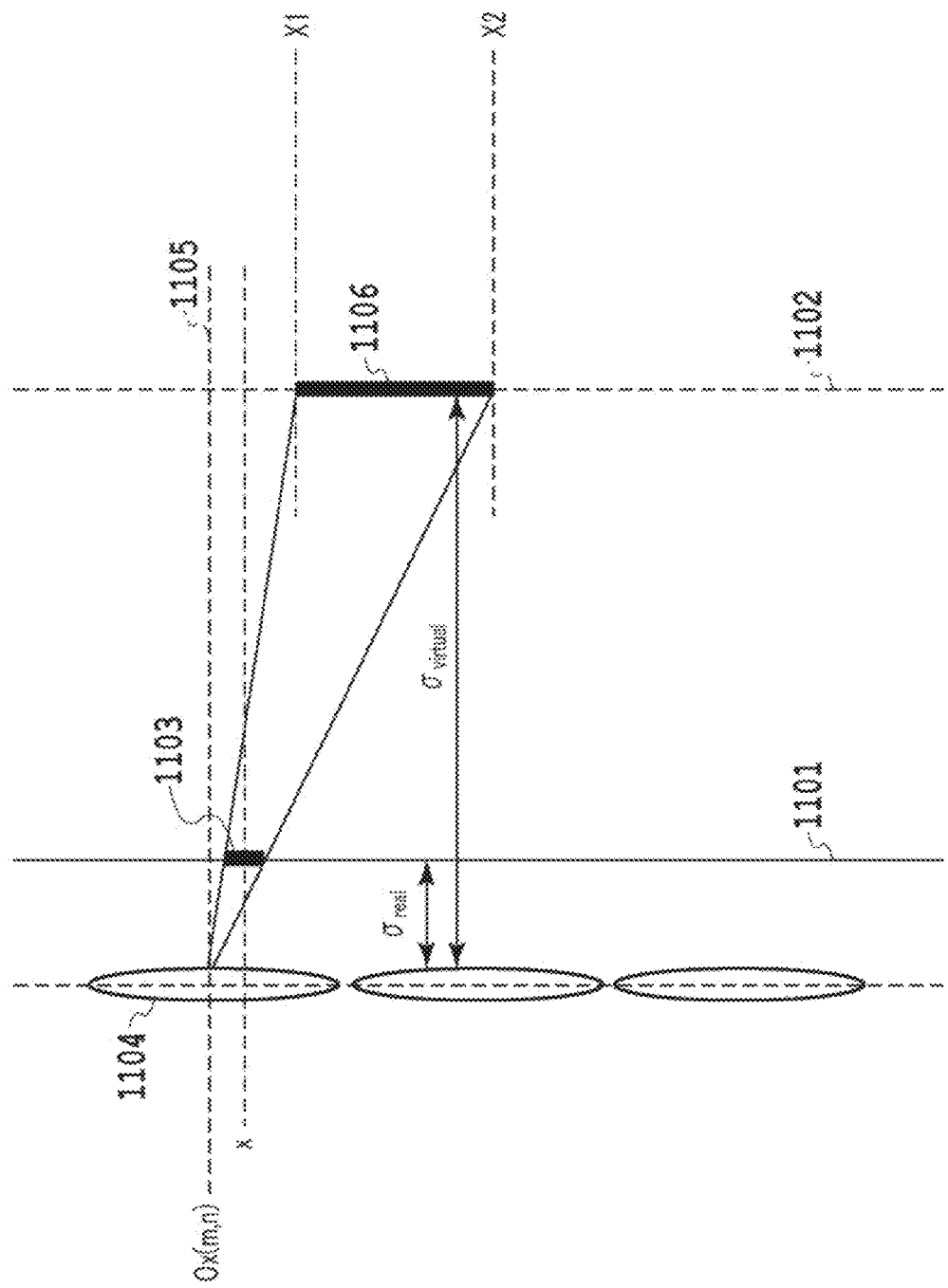
FIG. 11 is a diagram for explaining a pixel position calculation method in a pixel position calculation unit according to the first embodiment.

FIG. 11 is a diagram for explaining this calculation method. Here, it is assumed that the pixels corresponding to a sensor pixel region 1103 on a sensor 1101 are input to the image combination unit 604. In this case, the image combination unit 604 calculates a projection region 1106 on a virtual sensor 1102 corresponding to the sensor pixel region 1103 as a result. Here, Ox (m, n) is the position of the optical center of a microlens 1104, and (m, n) is a number indicating an index of the microlens and x indicates the position of the input pixel (in this diagram, the center position of the sensor pixel region 1103). X1 and X2 are the positions on the virtual sensor 1102 corresponding to the upper end part and the lower end part, respectively, of the sensor pixel region 1103 obtained by a calculation to be described later. The region between the calculated X1 and X2 is the projection region 1106 on the virtual sensor 1102 of the sensor pixel region 1103. As shown in FIG. 11, the projection region 1106, which is the sensor pixel region 1103 projected onto the virtual sensor 1102 with the optical center of the microlens 1104 as a reference, is the position on the combined image corresponding to the pixels of the input captured image data (in FIG. 11, the sensor pixel region 1103). Here, σ real is the distance between the sensor 1101 and each microlens 1104 and σ virtual is the distance between each microlens 1104 and the virtual sensor 1102. That is, the position apart from the microlens 1104 by the distance σ virtual is the position of the virtual sensor 1102 and is set by a user via the focus adjustment ring 314. As is obvious from FIG. 11, the projection region 1106 is enlarged relative to the sensor pixel region 1103 and the enlargement ratio is σ virtual/σ real. At this step, the positions of X1 and X2 that define the projection region 1106 are calculated in accordance with Formula (1) and Formula (2) below.

$$X1 = Ox(m,n) + (\sigma\text{virtual}/\sigma\text{real})(x+s/2-Ox(m,n)) \quad \text{Formula (1)}$$

$$X2 = Ox(m,n) + (\sigma\text{virtual}/\sigma\text{real})(x-s/2-Ox(m,n)) \quad \text{Formula (2)}$$

In Formula (1) and Formula (2) described above, s is the size of the sensor pixel region 1103. Information of the calculated X1 and X2 is sent to the pixel value calculation unit 803. In this manner, the pixel position of each pixel of the input captured image data and the pixel position in the combined image corresponding to an arbitrary refocus position are associated with each other.

Explanation is returned to the flowchart in FIG. 9.

At step 906, the color derivation unit 802 derives the color of each pixel in the input captured image data. Specifically, the color derivation unit 802 derives the color of each pixel by referring to a table indicating the correspondence between the pixel position and the color. Types of colors include RGB, infrared+RGB, CMY, etc., in accordance with the filter spectral sensitivity of the color filter array. Here, a case of three colors of RGB is considered. The table indicating the correspondence between the pixel position and the color is, for example, a table with 2,000 pixels in the vertical direction and 3,000 pixels in the transverse direction in the case where the resolution is six million pixels, and may be retained in the ROM 103, etc. Further, in the case where the relationship between the pixel position and the color is explicit in terms of a mathematical equation, such as in the case where image capturing unit 100 includes a color filter array of the Bayer array, it may also be possible to obtain the color from the pixel position by a predetermined calculation.

At step 907, the pixel value calculation unit 803 updates the data (intermediate data) within the memory unit 804. Specifically, the pixel value of the input captured image data corresponding to the pixel position in the combined image calculated at step 905 and the color derived at step 906 is stored in the memory unit 804.

FIG. 12 shows an example of the intermediate data stored in the memory unit 804. In FIG. 12, in each of indexes 1201 to 1203, one or more pixel values are retained. At this step, the pixel value is added/stored in accordance with the pixel position of the combined image received from the pixel position calculation unit 801 and the color information received from the color derivation unit 802, and thus, the intermediate data is updated. In the example in FIG. 12, the pixel position of the combined image is expressed by integers, but, X1 and X2 calculated by Formulas (1) and (2) described above are not integers in general. Because of this, it may also be possible to accept numbers other than integers as numerical values to identify the pixel position of the combined image and to use the fractional part as a weight in calculation of the pixel value of the combined image. For example, a case is considered where pixel value 20 is allocated to the coordinates (10, 10.4) indicating the pixel position of the combined image and similarly, pixel value 10 is allocated to the coordinates (10, 10.1). In this case, for example, to the coordinates (10, 10) indicating the pixel position of the combined image, pixel value 12 is allocated by a weighted calculation, such as (0.1*20+0.4*10)/(0.1+0.4), and so on.

At step 908, the pixel value calculation unit 803 determines whether the update of the intermediate data is completed for a predetermined index, that is, determines whether all the pixel values are stored in any of the indexes. For example, in the case where two pixel values (24 and 26) are stored in the index 1201 in FIG. 12 (part in the pixel position of the coordinates (10, 10) and the color of which is R), it is determined that the update of the intermediate data is completed. It is possible to perform this determination by calculating the number of pixel values that should be stored for each index in advance and by determining whether the number of stored pixel values reaches the number.

Here, the number of pixel values that should be stored in each index is obtained in advance as follows. First, a dummy captured image whose pixel values are all 1 is provided and the processing at step 905 to step 907 is performed using this as input captured image data. Then, after performing the processing on all the pixels, the number of stored pixel values is counted for each index.

In the case where it is determined that all the pixel values that should be added are stored in any of the indexes by such determination processing, the procedure proceeds to step 909. On the other hand, in the case where it is determined that all the pixel values are not stored in any of the indexes, the procedure returns to step 905 and the processing at step 905 to step 907 is repeated on the next pixel position on the combined image.

At step 909, the pixel value generation unit 805 acquires, from the memory unit 804, the intermediate data (pixel value of the multi-viewpoint image) in the index for which the update is completed, and calculates an average value of the data and outputs it as the pixel value of the combined image.

At step 910, the image combination unit 805 determines whether the above-described processing is completed for all the pixels of the input captured image data. In the case where there is no unprocessed pixel, the procedure proceeds to step 912. On the other hand, in the case where there is an unprocessed pixel, the procedure proceeds to step 911.

At step 911, the pixel value calculation unit 803 updates the pixel position of interest on the input captured image data. Then, the processing at step 903 and subsequent steps is repeated on the pixel position of interest after the update.

At step 912, the image combination unit 604 stores the value of each pixel supplied from the pixel value calculation unit 803 in the memory unit 806.

At step 913, the image enlargement unit 807 enlarges or reduces the combined image in accordance with the value of the virtual zoom magnification supplied as one of the image combination parameters and trims the enlarged or reduced image.

Figure 13A:
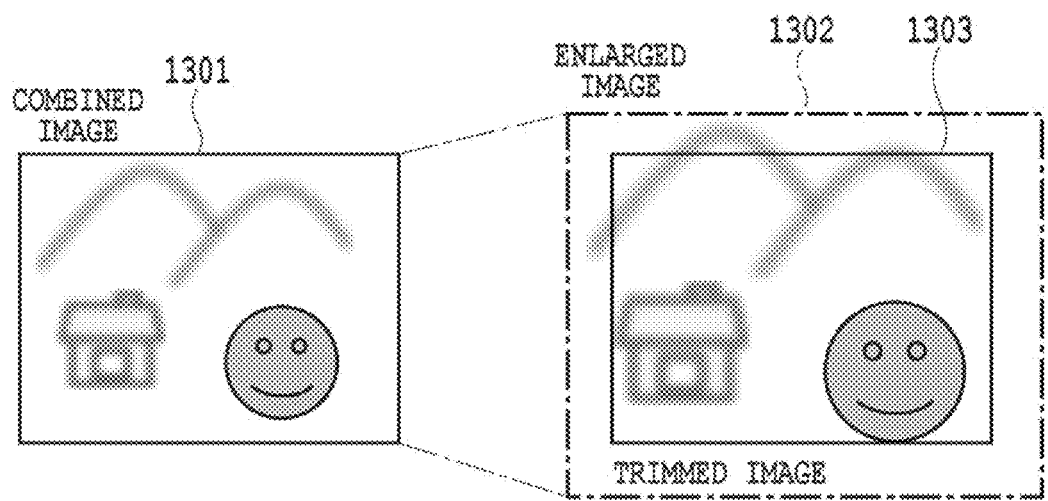
FIGS. 13A and 13B are diagrams for explaining enlargement/reduction processing of a combined image and trimming thereafter, respectively.
Figure 13B:
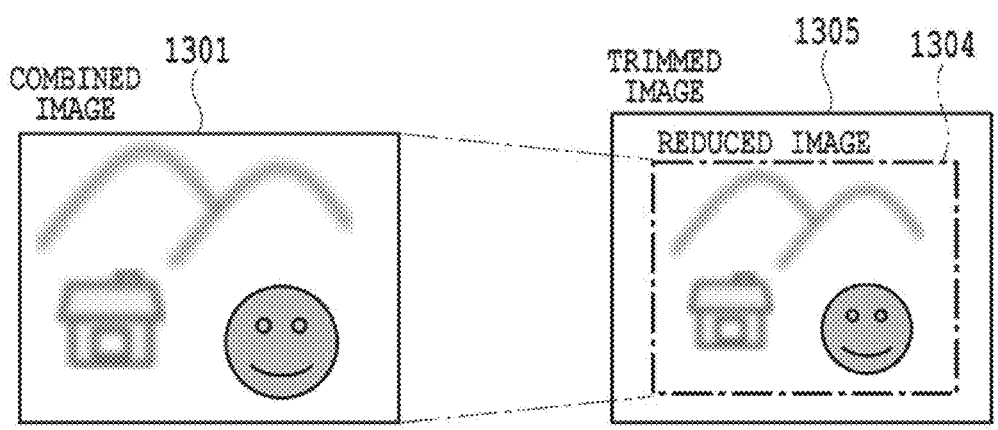

FIGS. 13A and 13B are diagrams for explaining enlargement/reduction processing of the combined image and subsequent trimming. FIG. 13A is a diagram for explaining a case where the virtual zoom magnification exceeds 1.0. In this case, a combined image 1301 is enlarged in accordance with a given zoom magnification and an enlarged image 1302 is generated. As the enlargement processing, interpolation processing, such as linear interpolation and cubic interpolation, is used. After that, trimming is performed so that the image size of the part in the vicinity of the center of the enlarged image 1302 is the same as that of the combined image 1301, and thus, a trimmed image 1303 is generated. FIG. 13B is a diagram for explaining a case where the virtual zoom magnification is less than 1.0. The combined image 1301 is reduced in accordance with a given zoom magnification and a reduced image 1304 is generated. After that, an appropriate pixel value (for example, pixel value 0) is given to the peripheral part of the reduced image 1304 so that the image size thereof is the same as that of the combined image 1301, and thus, a trimmed image 1305 is generated.

By the above processing, combined image data in accordance with the image combination parameters specified by a user is output.

In the flowchart shown in FIG. 9, the enlargement/reduction, and trimming of the image are performed last, but, it may also be possible to perform them prior to other processing. That is, it may also be possible to perform the processing corresponding to that at step 913 on the input captured image data in the first stage of the image combination processing, and to perform the processing at step 902 and subsequent steps based on the captured image after trimming.

In the present embodiment, as an example of the configuration of the image capturing unit 100, the configuration in which the microlens array 505 is arranged between the main lens 502 and the sensor 504 is explained, but, it may also be possible to use an image capturing unit having another configuration.

Figure 14:
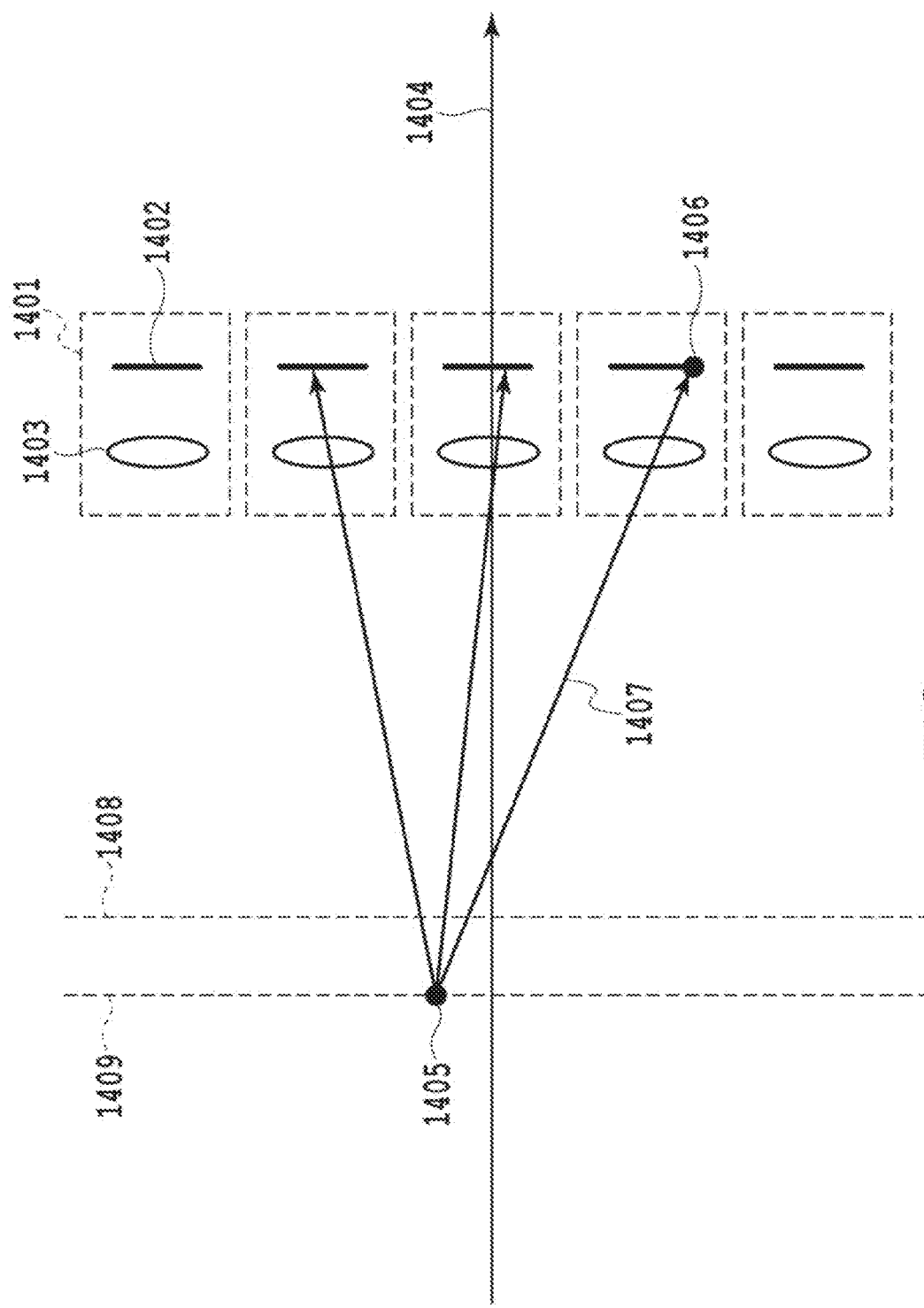
FIG. 14 is a diagram showing an example of a configuration of an image capturing unit.

FIG. 14 is a diagram showing another example of the configuration of the image capturing unit 100. In FIG. 14, the image capturing unit 100 includes a plurality of image capturing module 1401. Each of the image capturing modules 1401 includes a sensor 1402 and a lens 1403. Reference numeral 1404 denotes an optical axis. Light from an object point 1405 is recorded by the sensor 1402 within the image capturing module 1401. For example, a pixel 1406 on the sensor 1402 records the intensity of a light beam 1407. A case where virtual sensors 1408 and 1409 are arranged on the side of the object is considered, and it is assumed that the light beam group is extended in the direction toward the virtual sensors 1408 and 1409 and the light beam intensities are averaged at the virtual sensors 1408 and 1409. Then, an image calculated at the virtual sensor 1408 will be a blurred image of the object point 1405 out of focus. On the other hand, an image calculated at the virtual sensor 1409 will be an image of the object point 1405 in focus. As described above, by changing the position of the virtual sensor, it is possible to acquire by calculation an image whose focus position is adjusted after image capturing.

Here, the control of the virtual aperture is explained. In the case where an image is combined using only the captured image data supplied from the image capturing modules 1401 in the vicinity of the center at the time of combining the light beam group on the virtual sensor, it is possible to generate a refocus image in the state where the aperture is stopped down. On the other hand, in the case where an image is combined using all the captured image data supplied from the plurality of the image capturing modules 1401, it is possible to generate a refocus image in the state where the aperture is opened up.

As in FIG. 14, a unit configured to set the focus position and the f-stop of the image capturing unit including a plurality of the image capturing modules 1401 may be an operation unit in the shape of a ring that covers the plurality of the image capturing modules 1401 or an operation unit by an electronic dial. In the case where the operation unit used at the time of image capturing and the operation unit used at the time of image combination after image capturing are the same, the present first embodiment can be applied.

Further, the image combination processing is not limited to the above-described method. Any method may be accepted as long as the focus position, the depth of field, and the zoom magnification of captured image data are adjusted by image processing afterward.

For example, as the method for changing the focus position by image processing, there is known a method for performing filter processing on captured image data in accordance with the relative distance from the position of a subject in focus. In this case, first, captured image data whose depth of field is great and a distance map of the scene are acquired. The distance map is acquired by providing a distance sensor separately from the image capturing device or acquired by analyzing the captured image data of the image capturing device. Next, for a subject desired to be put into focus, filter processing is not performed but original captured image data is used, and for a region other than the subject desired to be put into focus, the relative distance from the subject is obtained from the distance map. Then, for a region whose relative distance from the subject desired to be put into focus is small, filter processing to reduce the amount of blur is performed (for example, the filter size is set relatively small). On the other hand, for a region whose relative distance from the subject desired to be put into focus is great, filter processing to increase the amount of blur is performed (for example, the filter size is set relatively large). By this method, the focus position may be changed.

The degree of the depth of field can also be adjusted by image processing by a method similar to the above. That is, by setting a larger filter size in the filtering processing on captured image data, the amount of blur increases and it is possible to generate image data with a shallow depth of field. On the contrary, in order to generate image data with a great depth of field, the filter size is reduced.

As described above, according to the invention of the present embodiment, the image combination parameters are set via the operation unit used to set image capturing parameters, and therefore, it is possible for a user to set the image combination parameters, such as the virtual focus position, in the same manner as that at the time of image capturing.

Second Embodiment

In the first embodiment, the aspect is explained, in which combined images with different focus positions, etc., are generated in accordance with the image combination parameters given via the operation unit included in the image capturing device. Next, an aspect is explained as a second embodiment, in which combined images corresponding to image combination parameters with a variety of contents are generated automatically in advance and an image meeting selection conditions (virtual focus position, etc.) given via the operation unit included in the image capturing device is selected and displayed on the display unit. Explanation of parts common to those of the first embodiment is simplified or omitted and here, different points are explained mainly.

<Configuration Diagram of Image Processing Unit>

Figure 15:
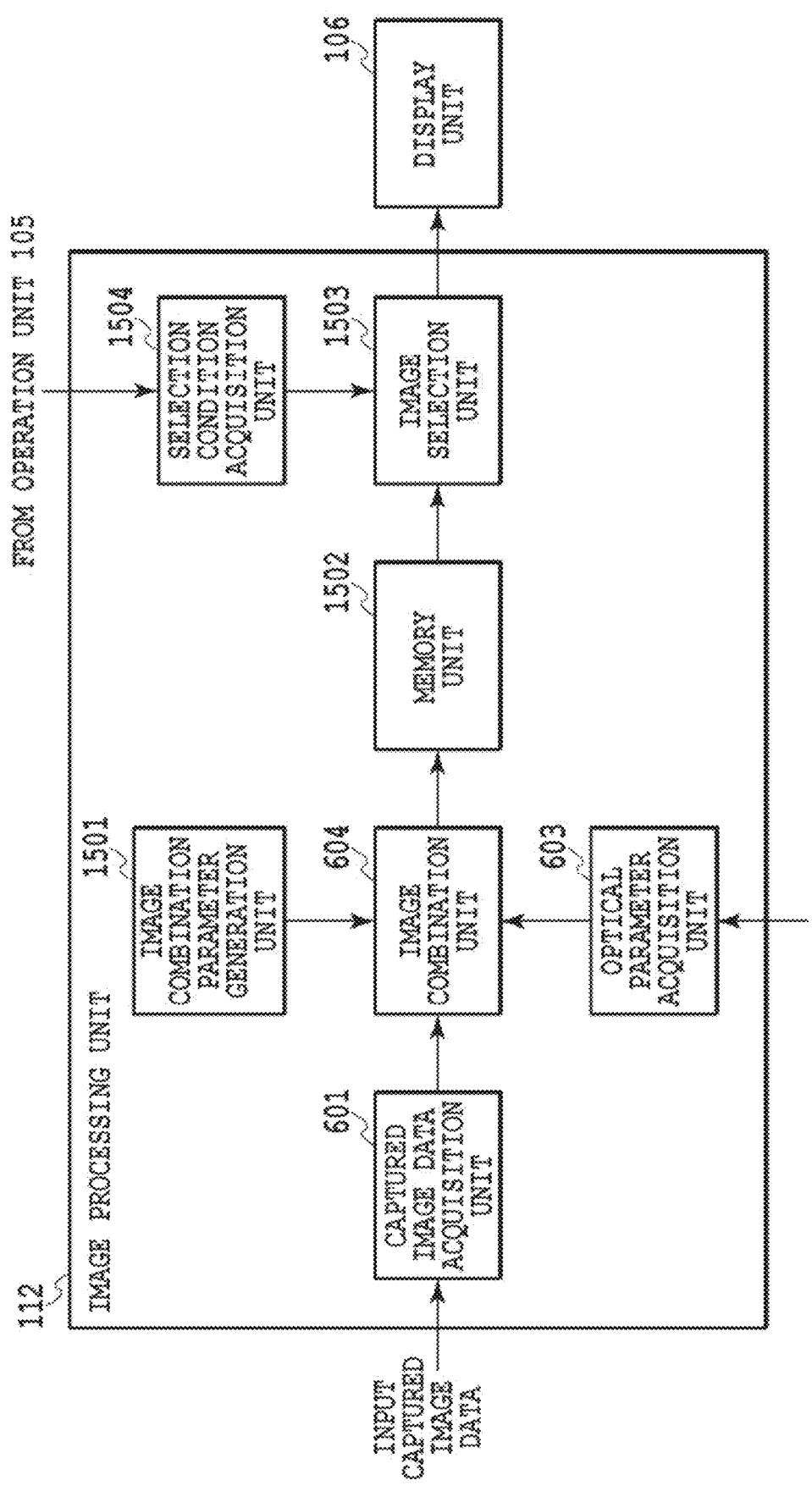
FIG. 15 is a block diagram showing an internal configuration of an image processing unit according to a second embodiment.

FIG. 15 is a block diagram showing an internal configuration of the image processing unit 112 according to the present embodiment. Compared with the image processing unit 112 shown in FIG. 6 according to the first embodiment, an image combination parameter generation unit 1501, a memory unit 1502, an image selection unit 1503, and a selection condition acquisition unit 1504 are added.

The image combination parameter generation unit 1501 generates image combination parameters, such as the virtual focus position, the virtual f-stop, and the virtual zoom magnification, used by the image combination unit 604.

The memory unit 1502 is a temporary storage region to store combined images generated by the image combination unit 604.

The image selection unit 1503 selects one or more combined images from a plurality of combined images stored in the memory unit 1502 in accordance with selection conditions corresponding to the image combination parameters supplied from the selection condition acquisition unit 1504.

Other processing units are the same as those in FIG. 6, and therefore, explanation thereof is omitted.

Figure 16:
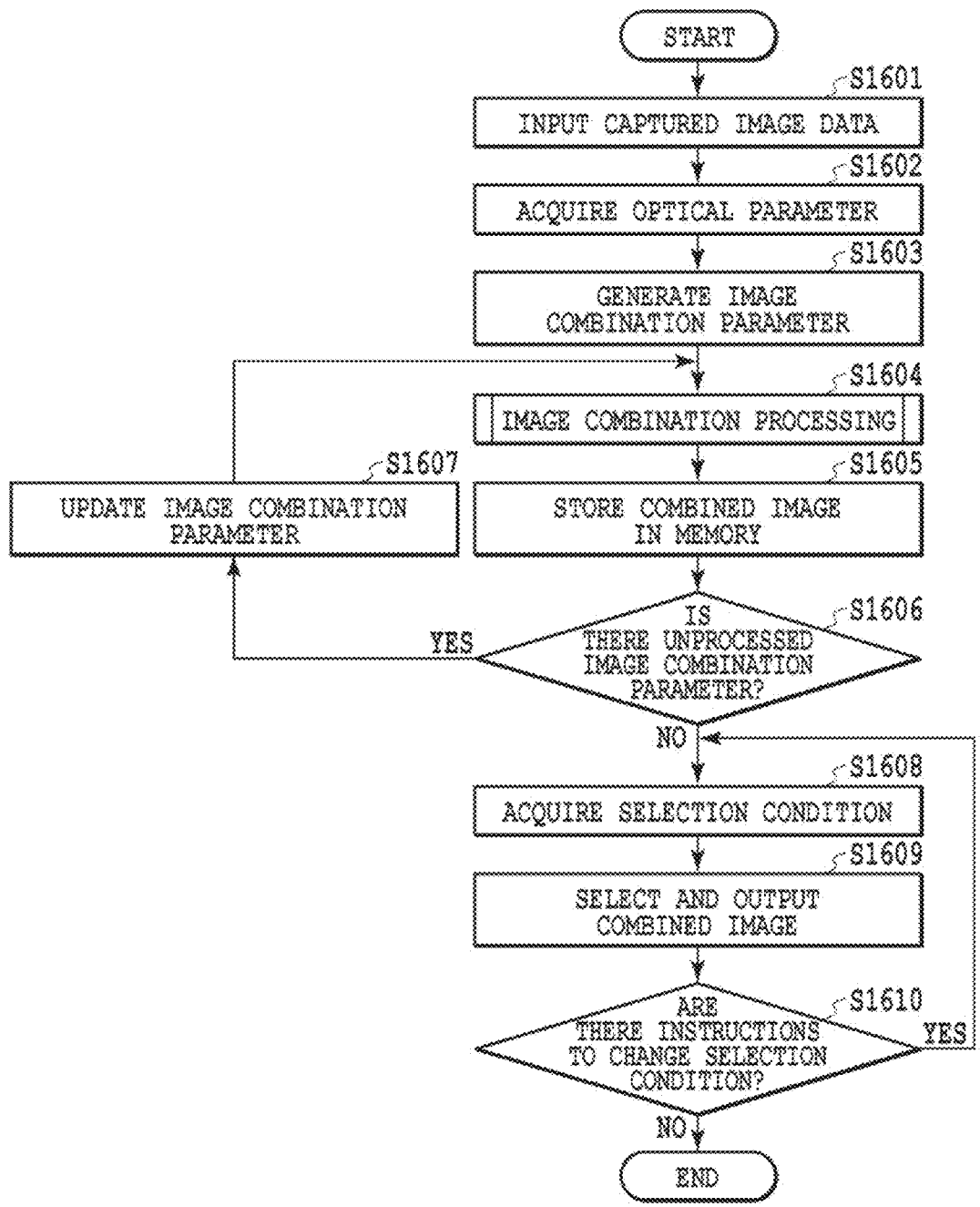
FIG. 16 is a flowchart showing a flow of image processing in the image processing unit according to the second embodiment.

FIG. 16 is a flowchart showing a flow of image processing in the image processing unit 112 according to the second embodiment. The series of pieces of processing is performed by the CPU 101 executing a computer-executable program in which a procedure to be shown below is described after reading the program from the ROM 103 onto the RAM 102.

At step 1601, the captured image data acquisition unit 601 acquires captured image data acquired by the image capturing unit 100.

At step 1602, the optical parameter acquisition unit 603 acquires the above-described optical parameters.

At step 1603, the image combination parameter generation unit 1501 generates a plurality of values of parameters, such as the virtual focus position, the virtual f-stop (F number), and the virtual zoom magnification, used for image combination in a range in which they can be varied, respectively. Specific examples are shown below. First, in the case of the virtual focus position, for example, for 100 μm before and after the focus position where light beams passing through the main lens converge on one point, virtual focus positions by which positions of the virtual sensors are set at 5 μm intervals are generated. That is, 41 virtual focus positions, such as −100 μm, −95 μm, . . . 95 μm, and 100 μm, are generated for the current focus position. Next, in the case of the virtual f-stop, for example, f-stops are generated by stopping down the aperture of the main lens step by step from the state where the aperture is fully opened up. F2.8 is set for the state where the aperture is fully opened up and seven f-stops of F2.8, F4, F5.6, F8, F11, F16, and F22 are generated. In the case of the virtual zoom magnification, for example, 21 zoom magnifications are generated from 0.5 to 2 at 0.1 intervals. The upper limit value and the lower limit value of each parameter to be generated may be read from those set in advance for reference, or a user may input via the operation unit in the stage when this step is started.

FIG. 17 is an example of a table putting together the image combination parameters generated by the image combination parameter generation unit 1501. The table includes 41 virtual focus positions, 7 virtual f-stops, and 21 virtual zoom magnifications, resulting in 6,027 (=41×7×21) combinations of image combination parameters in total.

Explanation is returned to the flowchart in FIG. 16.

At step 1604, the image combination unit 604 performs image combination processing using the image combination parameters supplied from the image combination parameter generation unit 1501 and the optical parameters supplied from the optical parameter acquisition unit 603. In the case of the image combination parameters shown in FIG. 17, 6,027 combined images are generated as a result. The contents of the image combination processing are the same as those of the first embodiment, and therefore, explanation thereof is omitted.

At step 1605, the combined image generated by the image combination unit 604 is stored in the memory unit 1502. At this time, the image combination parameters used and the combined image are associated with each other and retained in the ROM 103, etc., so that it is possible to identify the image combination parameters by which the combined image is generated.

At step 1606, the image processing unit 112 determines whether or not the combined images are generated for all the combinations of image combination parameters generated at step 1603. In the case where it is determined that there is an unprocessed image combination parameter, the procedure proceeds to step 1607. On the other hand, in the case where it is determined that the combine images are generated for all the image combination parameters, the procedure proceeds to step 1608.

At step 1607, the image combination parameter generation unit 1501 updates the image combination parameters. Then, until the processing of all the image combination parameters is completed, the processing at step 1604 to step 1606 is performed repeatedly.

At step 1608, the selection condition acquisition unit 1504 acquires the selection conditions specified via the operation unit 105. As in the case of the image combination parameters in the first embodiment, the selection conditions here are set by a user via the focus adjustment ring 314, the aperture adjustment ring 315, and the zoom adjustment ring 313.

Figure 18:
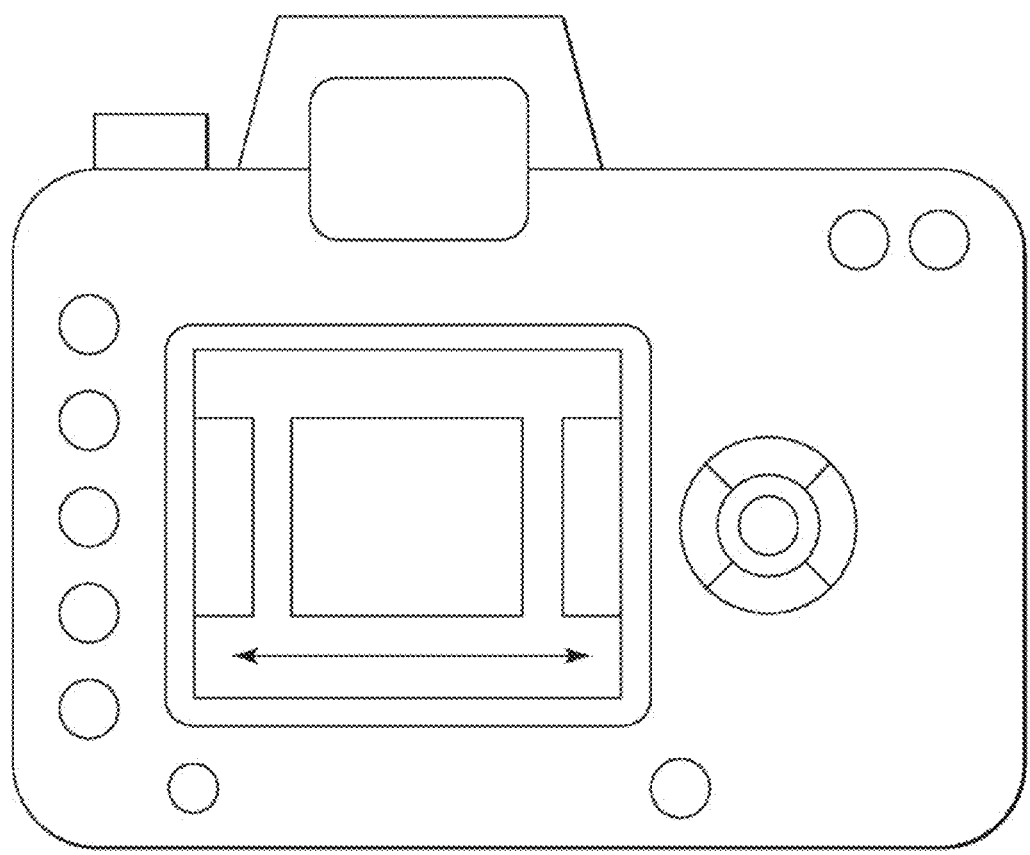
FIG. 18 is a diagram showing an example of a display aspect of a combined image meeting selection conditions.

At step 1609, the image selection unit 1503 refers to the selection conditions supplied from the selection condition acquisition unit 1504 and selects a preferred combined image meeting the selection conditions from the combined image data stored in the memory unit 1502. At this time, in the case where a combined image that perfectly meets the selection conditions is not stored in the memory unit 1502, it is sufficient to select a combined image closest to the selection conditions from among the stored combined images. The selected combined image is displayed on the display unit 106. FIG. 18 is a diagram showing an example of the aspect of the display of the combined image meeting the selection conditions. In this example, the combined image closest to the selection conditions is displayed at the center of the liquid crystal monitor 308 and part of the combined images second closest to the selection conditions are displayed on both sides of the liquid crystal monitor 308, and the combined images are scroll-displayed in accordance with the change in the selection conditions via the operation unit.

At step 1610, the image processing unit 112 determines whether or not there are instructions to change the selection conditions (operation of the operation unit 105 by a user). In the case where it is determined that there are instructions to change the selection conditions, the procedure returns to step 1608. Then, a combined image meeting the selection conditions after the change is selected (step 1609). On the other hand, in the case where it is determined that there are no instructions to change the selection conditions, this processing is exited.

As explained above, according to the invention of the present embodiment, a plurality of combined images corresponding to the image combination parameters generated in a predetermined range is generated in advance and stored in the memory, and a combined image meeting the selection conditions specified by a user is selected therefrom. Because of this, it is made possible to display a desired combined image more quickly.

Third Embodiment

In the first embodiment and the second embodiment, the aspect is such that the image combination processing is performed on the premise that the virtual sensor plane is a plane perpendicular to the optical axis of the main lens. Next, an aspect is explained as a third embodiment, in which the virtual sensor plane is changed in accordance with the posture of the image capturing device and a combined image on the virtual sensor plane that has changed is generated and displayed. Explanation of parts common to those of the first and second embodiments is simplified or omitted and here, only the different points are explained mainly.

<Configuration Diagram of Image Processing Unit>

Figure 19:
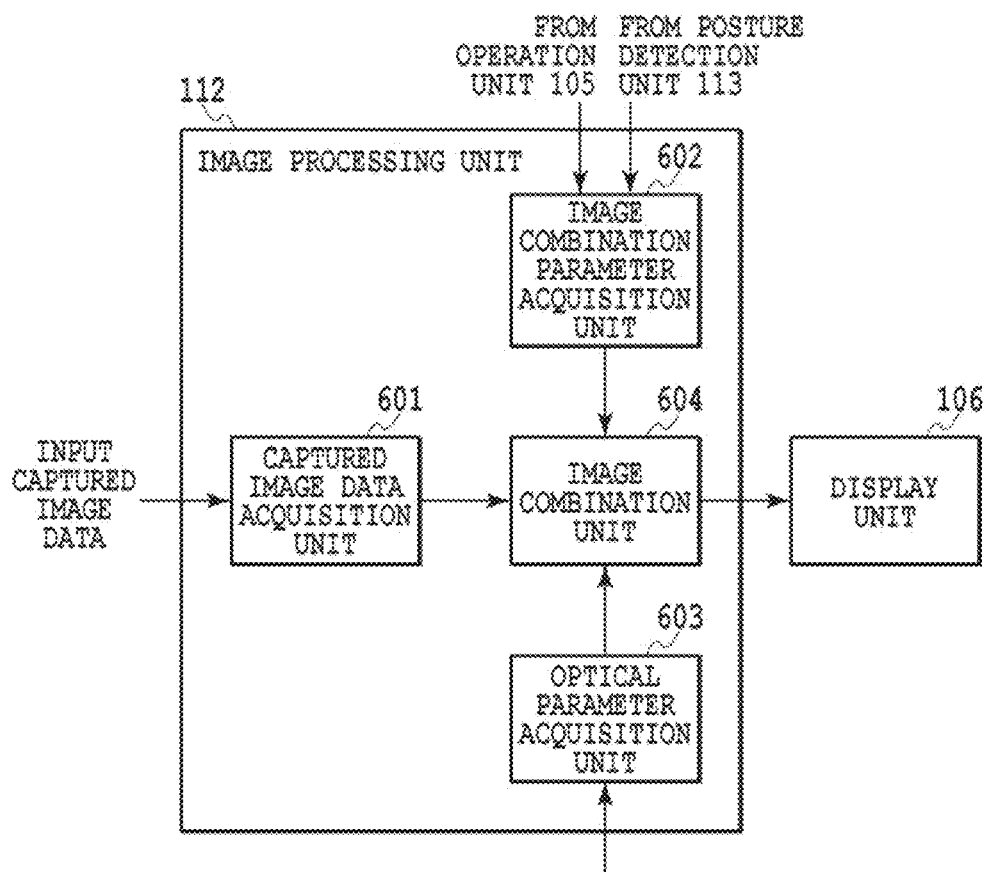
FIG. 19 is a block diagram showing an internal configuration of an image processing unit according to a third embodiment.

FIG. 19 is a block diagram showing an internal configuration of the image processing unit 112 according to the present embodiment. Compared with the image processing unit 112 shown in FIG. 6 according to the first embodiment, an input from the posture detection unit 113 is added to the image combination parameter acquisition unit 602. That is, the image combination parameter acquisition unit 602 in the present embodiment acquires information on the posture (posture information) of the image capturing device (or the image capturing unit 100) from the posture detection unit 113 as an image combination parameter in addition to the virtual focus position, the virtual f-stop, and the virtual zoom magnification. Then, the image combination unit 604 generates a combined image that has also taken into account the posture of the image capturing device.

The image processing (see the flowchart in FIG. 7) in the image processing unit 112 according to the present embodiment is the same as that of the first embodiment except for the contents of the image combination processing. That is, the posture information of the image capturing device is input as one of the image combination parameters (step 703) and combined image data is output (step 705) through the image combination processing (step 704). Then, whether the posture of the image capturing device has changed is determined (step 706) as one of the "determinations of whether or not there are instructions to change the image combination parameters", and in the case where the posture has changed, the procedure returns to step 703 and the image combination processing in accordance with the posture that has changed (step 704) is repeated. In the following, the contents of the image combination processing peculiar to the present embodiment are explained.

<Image Combination Processing>

The internal configuration of the image combination unit 604 in the present embodiment is the same as the internal configuration of the image combination unit 604 shown in FIG. 8 according to the first embodiment. The difference lies in that the pixel position calculation unit 801 calculates a pixel position that has taken into account not only the optical parameters but also the posture information. Detailed explanation is given below.

Figure 20A:
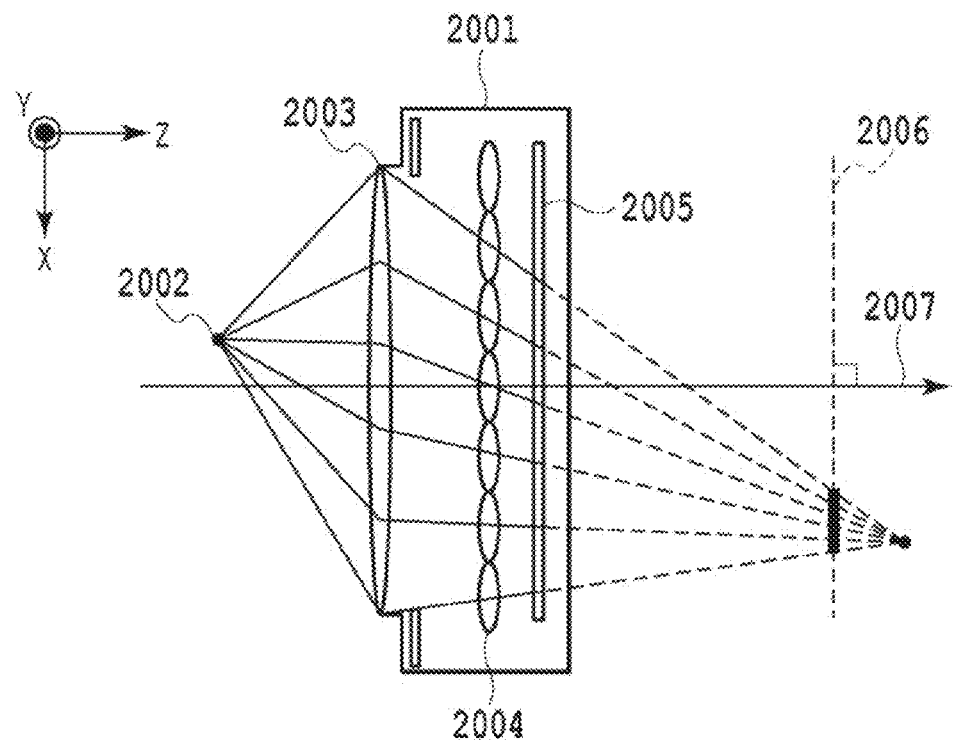
FIGS. 20A and 20B are diagrams showing the way an inclination of a virtual sensor changes in accordance with a change in posture of an image capturing device.
Figure 20B:
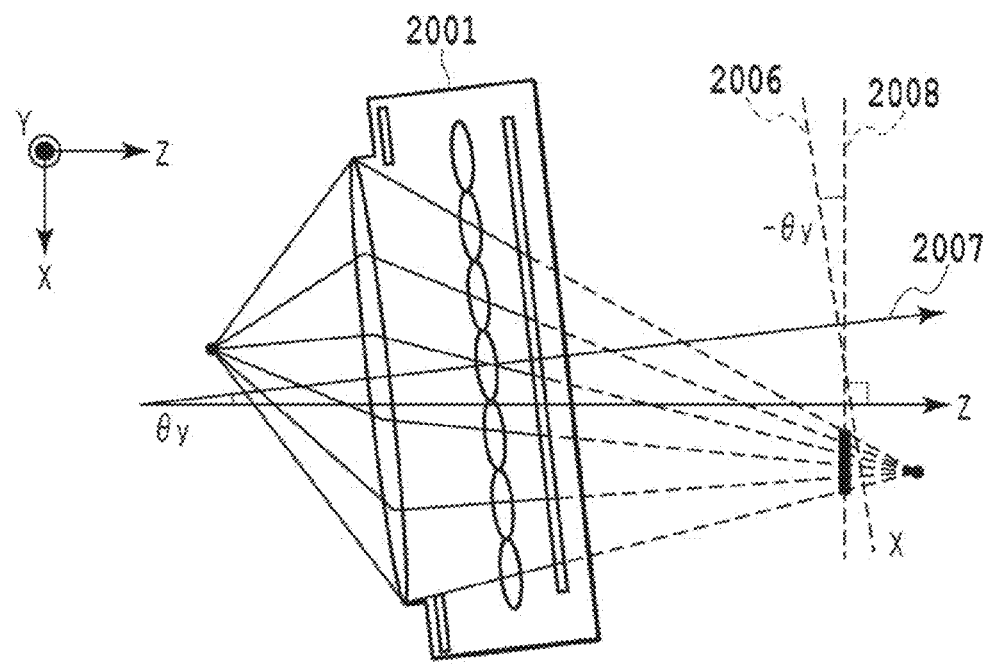

FIGS. 20A and 20B show the way the inclination of the virtual sensor (inclination relative to the optical axis of the main lens) changes in accordance with the change in the posture of the image capturing device. Here, as in FIG. 5, light emitted from an object point 2002 is collected by a main lens 2003 and passes through a microlenses array 2004 and recoded by a sensor 2005 before forming an image. Then, the light beam group obtained from the object point 2002 is extended and an image at the position of a virtual sensor C (2006) is calculated, and therefore, the light from the object point 2002 spreads and a blurred image is obtained. FIG. 20A shows the state at the time of the start of the image combination processing and it is known that the inclination of the virtual sensor C (2006) is the angle (90 degrees) perpendicular to an optical axis 2007. In FIG. 20A, the optical axis 2007 of an image capturing unit 2001 agrees with a Z-axis of a global coordinate system. FIG. 20B shows the state where the image capturing unit 2001 has rotated by an angle of +θy about a Y-axis after a fixed time elapses (rotation in the counterclockwise direction is set as rotation in the positive direction). During the image processing, control is performed so that the inclination of the virtual sensor C (2006) agrees with that of a virtual sensor D (2008) the inclination of which has rotated by an angle of −θy based on the posture information supplied from the posture detection unit 113, and thereby the same posture as that at the time of the start of the processing is kept in the direction perpendicular to the Z-axis direction.

The flow itself of the image combination processing in the image combination unit 604 according to the present embodiment is the same as that of the flowchart in FIG. 9 according to the first embodiment. In the following, in accordance with the flowchart in FIG. 9, the image combination processing in the present embodiment is explained. As in the first embodiment, explanation is given on the assumption that the captured image data (input captured image data) of the digital value supplied from the captured image data acquisition unit 601 is one-dimensional data.

At step 901, the pixel position calculation unit 801 acquires the image combination parameters, the optical parameters, and the camera posture information necessary for image combination from the bus (not shown schematically). The image combination parameters and the optical parameters are the same as those of the first embodiment. The camera posture information is information on the camera posture of the image capturing device. More specifically, the amount of rotation in each axis direction of XYZ of the image capturing device supplied from the posture detection unit 113 is the camera posture information. Here, in order to simplify explanation, only an amount of rotation of θy of the image capturing device in the Y-axis direction is explained as the camera posture information.

Step 902 and step 903 are the same as those of the first embodiment.

At step 904, the pixel position calculation unit 801 of the image combination unit 604 calculates the pixel position in the combined image of each pixel of the input captured image data.

Figure 21:
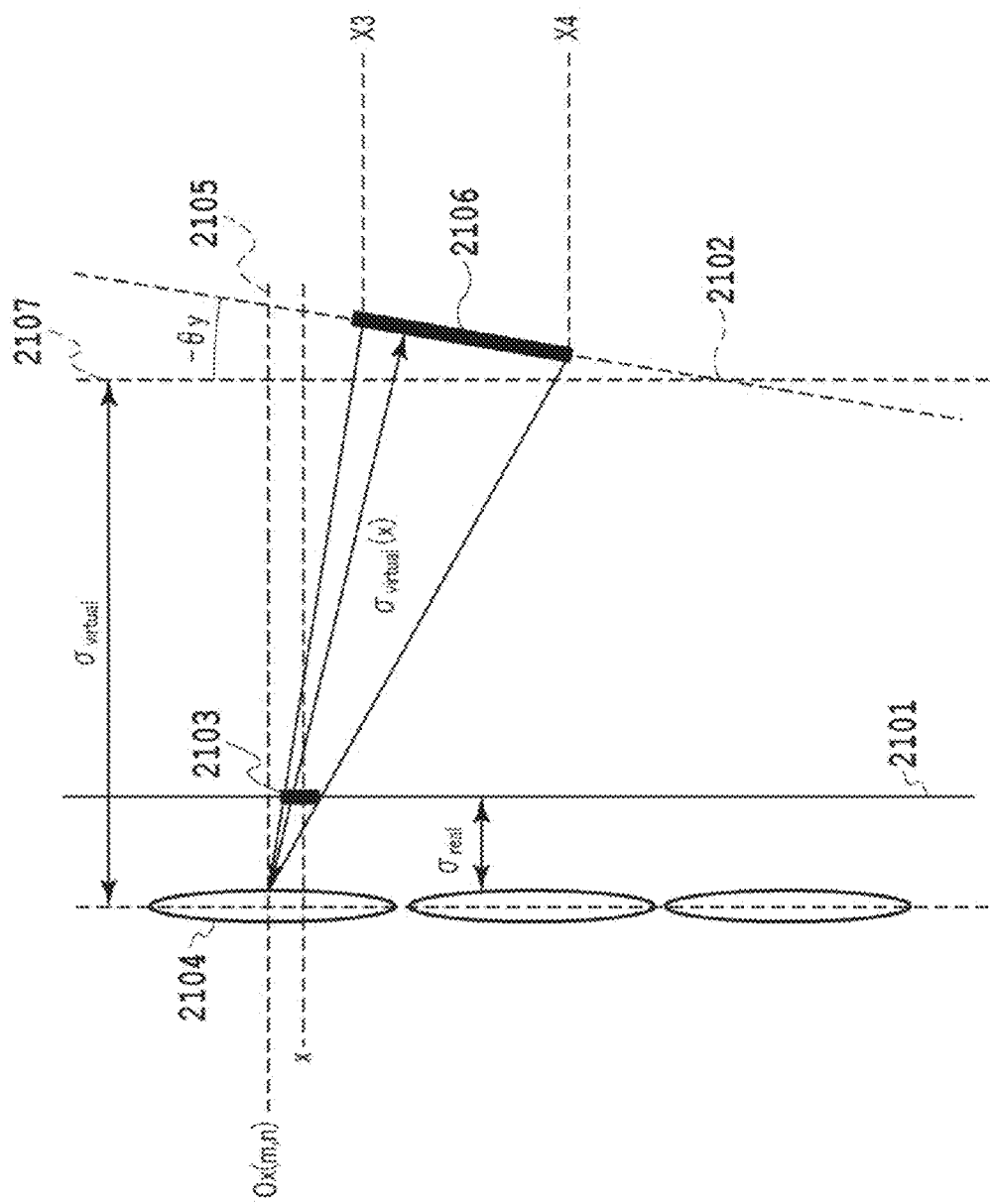
FIG. 21 is a diagram for explaining a pixel position calculation method in the third embodiment.

FIG. 21 is a diagram for explaining a calculation method of the pixel position at step 904 in the present embodiment. Compared with the calculation method in the first embodiment in FIG. 11, it is known that a virtual sensor 2105 is set to an angle rotated by −θy. Here, it is assumed that a pixel corresponding to a sensor pixel region 2103 on a sensor 2101 is input to the image combination unit 604. In this case, the image combination unit 604 calculates a projection region 2106 on the virtual sensor 2105 corresponding to the sensor pixel region 2103 as a result. In FIG. 21, Ox (m, n) is the position of the optical center of a microlens 2104. Here, (m, n) is a number expressing the index of the microlens and x indicates the position of the input pixel (in FIG. 21, the center position of the sensor pixel region 2103). X3 and X4 indicate the positions on the virtual sensor 2105 corresponding to the upper end part and the lower end part of the sensor pixel region 2106 obtained by a calculation, to be explained later. The region between the calculated X3 and X4 corresponds to the projection region 2106 on the virtual sensor 2105 of the sensor pixel region 2103. As shown in FIG. 21, the projection region 2106, which is the sensor pixel region 2103 projected onto the virtual sensor 2105 with the optical center of the microlens 2104 as a reference, is the position on the combined image corresponding to the pixel (in FIG. 21, the sensor pixel region 2106) of the input captured image data. In FIG. 21, σ real is the distance between the sensor 2101 and each microlens and σ virtual (x) is the distance between the microlens 2104 at the pixel position x and the virtual sensor 2105. The distance u virtual (x) between the microlens 2104 at this pixel position x and the virtual sensor 2105 is calculated in accordance with Formula (3) below.

$$\sigma\text{virtual}(x) = \sigma\text{virtual} \cdot \cos\theta y - (x-s/2)\sin\theta y \quad \text{Formula (3)}$$

Here, σ virtual is the distance between the microlens 2104 and a virtual sensor 2107 located in the direction parallel to the microlens 2104 set by a user via the focus adjustment ring 314, and s is the size of the sensor pixel region 2103.

In the calculation processing of the pixel position in the combined image at step 904, the positions of X3 and X4 that define the projection region 2106 are calculated in accordance with Formula (4) to Formula (9) below.

$$X3 = x3/(1-k1 \cdot \tan\theta y) \quad \text{Formula (4)}$$

$$X4 = x4/(1-k2 \cdot \tan\theta y) \quad \text{Formula (5)}$$

$$k1 = (x3-x)/(\sigma\text{virtual}-\sigma\text{real}) \quad \text{Formula (6)}$$

$$k2 = (x4-x)/(\sigma\text{virtual}-\sigma\text{real}) \quad \text{Formula (7)}$$

$$x3 = Ox(m,n) + (\sigma\text{virtual}(x)/\sigma\text{real})(x+s/2-Ox(m,n)) \quad \text{Formula (8)}$$

$$x4 = Ox(m,n) + (\sigma\text{virtual}(x)/\sigma\text{real})(x-s/2-Ox(m,n)) \quad \text{Formula (9)}$$

In Formula (4) to Formula (9) described above, s is the size of the sensor pixel region 2103. Information of the calculated X3 and X4 is output to the pixel value calculation unit 803. In this manner, the pixel position of each pixel of the input captured image data and the pixel position in the combined image in accordance with an arbitrary refocus position based on the posture information are associated.

Subsequent step 905 to step 913 are the same as those of the first embodiment, and therefore, explanation thereof is omitted.

Figure 22:
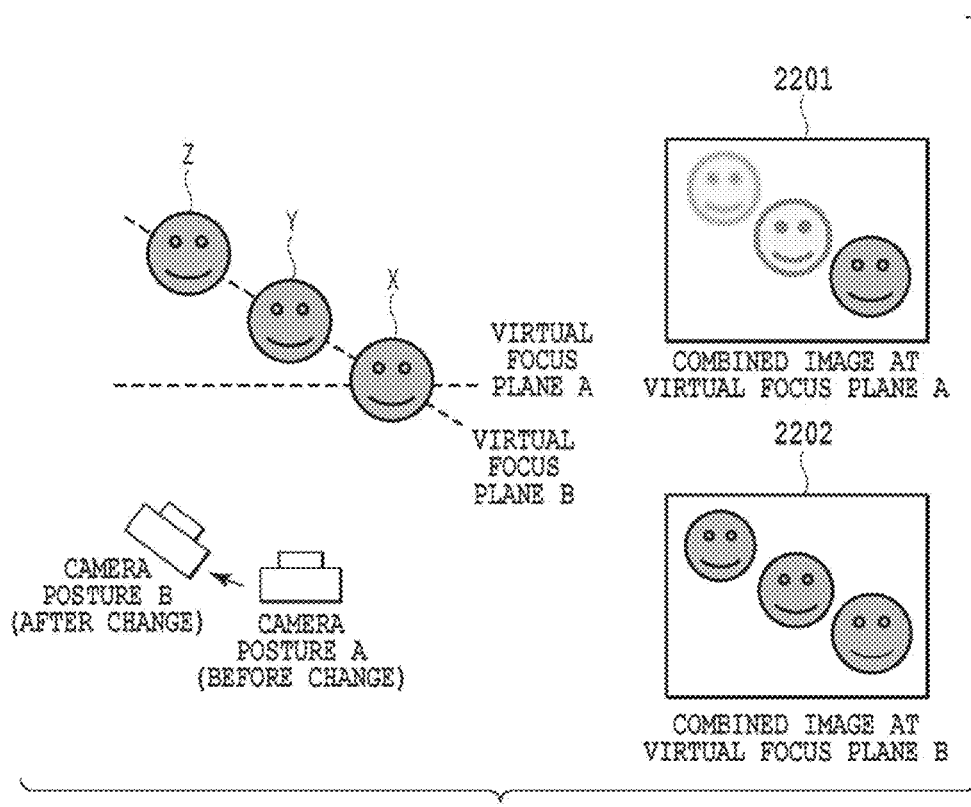
FIG. 22 is a diagram for explaining the way a combined image changes in accordance with a change in posture of an image capturing device.

FIG. 22 is a diagram for explaining the way the combined image changes in accordance with the change in the posture of the image capturing device. It is assumed that the initial posture of the image capturing device is such a state as shown in FIG. 20A (camera posture A). The focus plane at the virtual focus position at this time is a virtual focus plane A. In this case, on the display unit 106, a combined image 2201 in which a subject X is in focus is displayed as a result. It is assumed that the posture of the image capturing device has changed into such a state as shown in FIG. 20B (camera posture B) after that. The focus plane at the virtual focus position at this time is a virtual focus plane B. In this case, on the display unit 106, a combined image 2202 in which all the subjects X, Y, and Z are in focus is displayed as a result.

As described above, in the present embodiment, the image combination processing is enabled, in which the inclination of the virtual focus plane is caused to follow the posture of the image capturing device. It is possible for an appropriate image capturing device to perform image combination by reproducing the change in the focus plane in the global coordinate system, which would occur in accordance with the change in the posture of the image capturing device, by changing the inclination of the virtual focus plane in accordance with the change in the posture of the image capturing device.

It may also be possible to provide a plurality of combined images in advance for the supposed postures of the image capturing device and to select and display a combined image in accordance with the posture of the image capturing device, as in the second embodiment.

As explained above, according to the invention of the present embodiment, it is made possible to display a more natural combined image that follows the posture of the image capturing device by changing the inclination of the virtual focus plane in accordance with the posture of the image capturing device.

Fourth Embodiment

In the first to third embodiments, the aspects are such that the captured image data acquired by a camera array image capturing device (also referred to simply as a "camera array", as known as camera array system, multiple lens camera, and the like) capable of acquiring a multi-viewpoint image at a time is used. Next, an aspect is explained as a fourth embodiment, in which by using captured image data obtained by a single lens image capturing device, an image whose focus position, etc., is changed is displayed without performing image combination processing. Explanation of parts common to those of the first to third embodiments is simplified or omitted and here, different points are explained mainly.

The configuration of an image capturing unit of the single lens image capturing device according to the present embodiment is the configuration in FIG. 2 from which the microlens array 206 is omitted. Other main configurations of the image capturing device are the same as those of the camera array image capturing device described in the first embodiment, etc., and therefore, explanation thereof is omitted.

In the present embodiment, a plurality of pieces of captured image data is acquired by bracket image capturing for acquiring a plurality of images while slightly changing the image capturing parameters. Specifically, captured image data is acquired while changing the focus adjustment ring 314, the aperture adjustment ring 315, and the zoom adjustment ring 313 stepwise. It is assumed that in the captured image data by the bracket image capturing, the parameters at the time of image capturing are retained together with the captured image as one unit. That is, in the first to third embodiments, from one piece of captured image data including a multi-viewpoint image, a combined image whose focus position, etc., is changed is generated by calculation, but, in the present embodiment, from a plurality of pieces of captured image data obtained by the bracket image capturing, a desired captured image is selected and displayed.

Figure 23:
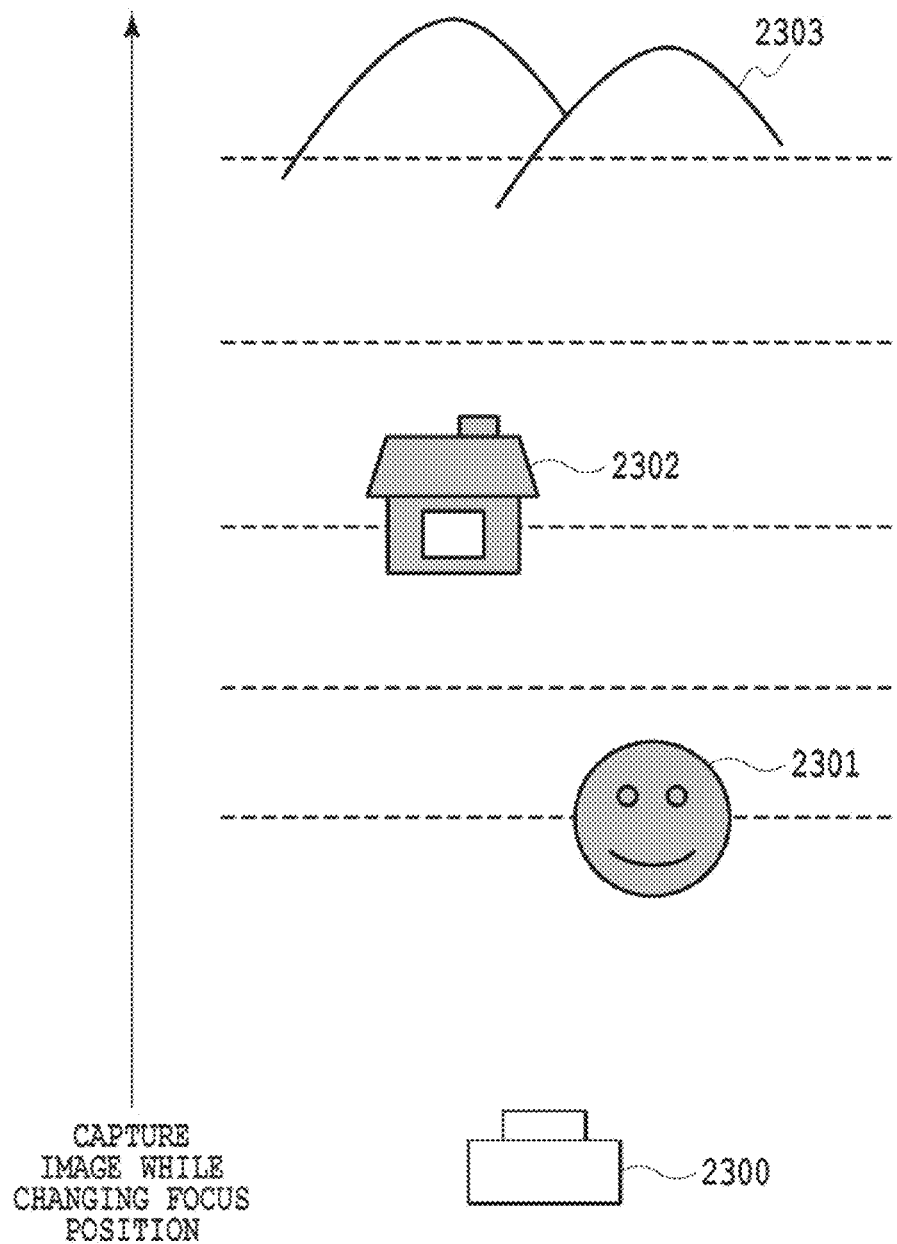
FIG. 23 is an explanatory diagram of bracket image capturing (focus bracket image capturing) in which the focus position is changed stepwise.
Figure 24:
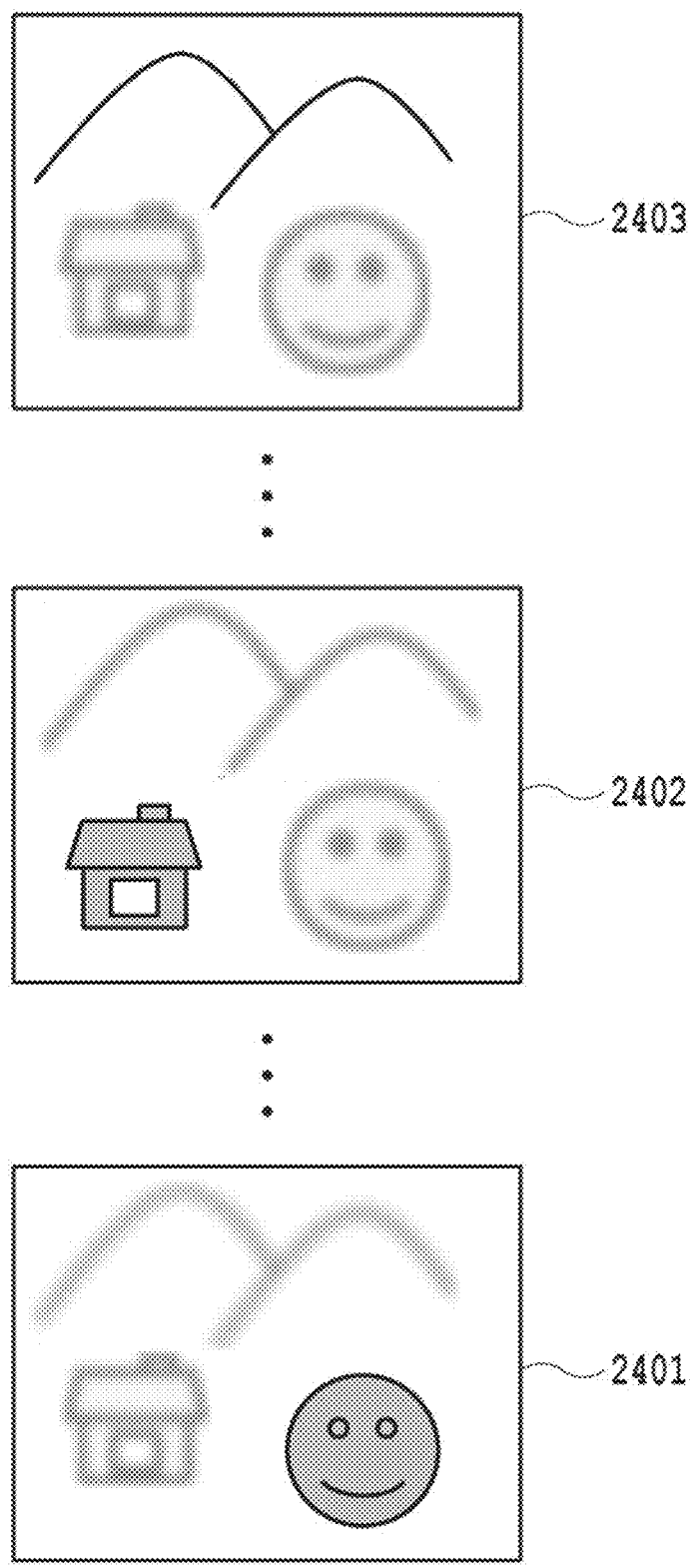
FIG. 24 is a diagram showing an example of captured images obtained by focus bracket image capturing.

FIG. 23 is an explanatory diagram of bracket image capturing (focus bracket image capturing) in which the focus position is changed stepwise. In the focus bracket image capturing, while using the operation unit included in an image capturing device 2300 and configured to perform focus adjustment, the focus position is changed stepwise and image capturing is performed a plurality of times. In FIG. 23, there are three subjects 2301 to 2303 at different distances from the image capturing device 2300, respectively. The subject 2301 is located at a position closest to the image capturing device 2300, the subject 2302 is at a position at a middle distance, and the subject 2303 is at the most distant position, respectively. In the present embodiment, the focus position is changed continuously so as to cover the range from the closest subject to the most distant subject and captured image data is acquired at each focus position. FIG. 24 shows an example of captured images obtained by the focus bracket image capturing in the circumstances in FIG. 23. A captured image 2401 is a captured image in which the subject 2301 is in focus. A captured image 2402 is a captured image in which the subject 2302 is in focus. A captured image 2403 is a captured image in which the actual focus bracket image capturing, a part where the main subjects 2301 to 2303 do not exist (for example, part between the subject 2301 and the subject 2302) is put into focus and image capturing is performed. Then, in the obtained captured image data, information on the focus position at the time of image capturing is recorded in association with the captured image.

Such bracket image capturing is performed similarly with other image capturing parameters, such as the f-stop and the zoom magnification.

<Configuration Diagram of Image Processing Unit>

Figure 25:
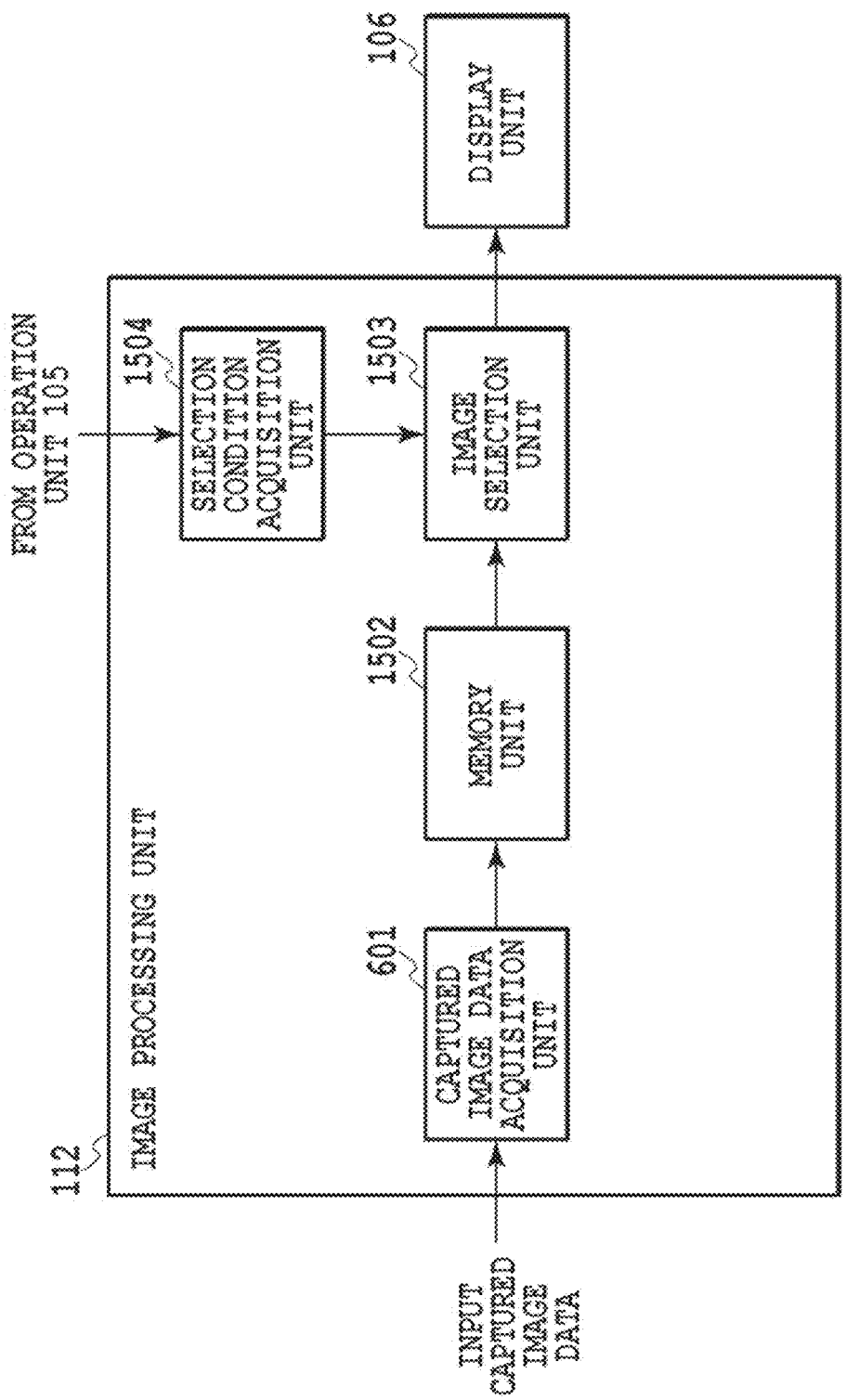
FIG. 25 is a block diagram showing an internal configuration of an image processing unit according to a fourth embodiment.

FIG. 25 is a block diagram showing the internal configuration of the image processing unit 112 according to the present embodiment. Compared to the image processing unit 112 (see FIG. 15) according to the second embodiment, it is known that the image combination parameter generation unit 1501, the image combination unit 604, and the optical parameter acquisition unit 603 are not included. Other common units (the captured image data acquisition unit 601, the memory unit 1502, the image selection unit 1503, the selection condition acquisition unit 1504) are the same as those of the image processing unit 112 according to the second embodiment, and therefore, explanation thereof is omitted.

Figure 26:
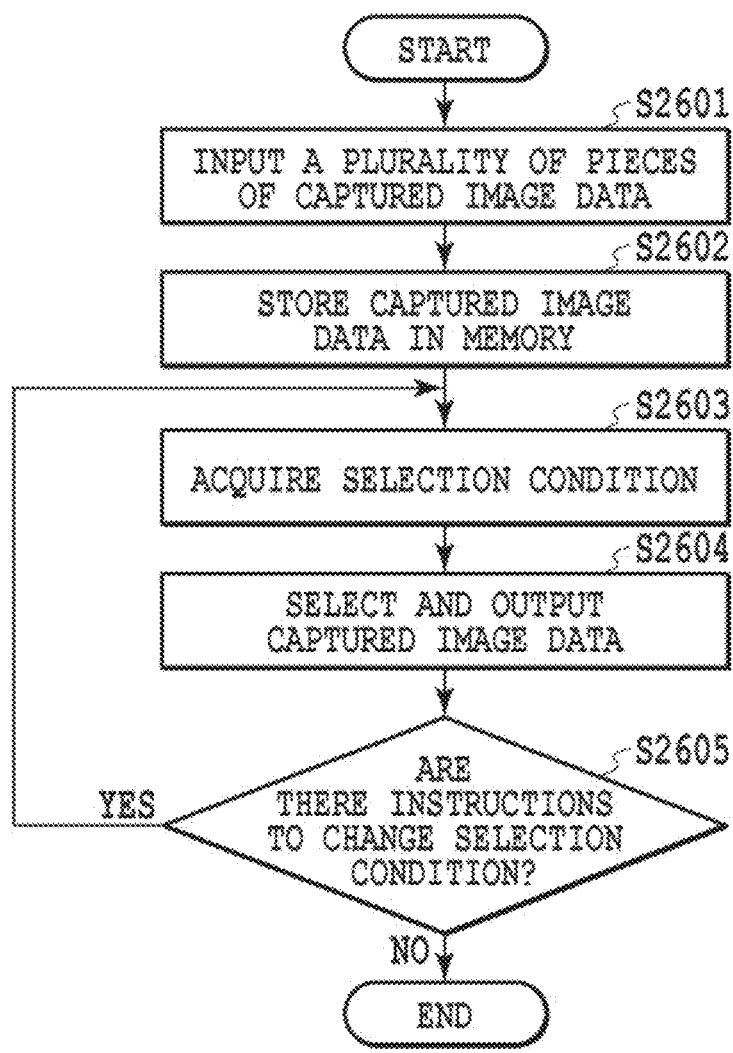
FIG. 26 is a flowchart showing a flow of image processing in the image processing unit according to the fourth embodiment.

FIG. 26 is a flowchart showing a flow of image processing in the image processing unit 112 according to the present embodiment. The series of pieces of processing is performed by the CPU 101 executing a computer-executable program in which a procedure to be shown below is described after reading the program from the ROM 103 onto the RAM 102.

At step 2601, the captured image data acquisition unit 601 acquires a plurality of pieces of captured image data obtained by the bracket image capturing described previously. In each of the pieces of captured image data acquired here, the information, such as the focus position, the f-stop, and the zoom magnification, at the time of image capturing is attached to each captured image.

At step 2602, the acquired captured image data is stored in the memory unit 1502.

At step 2603, the selection condition acquisition unit 1504 acquires the selection conditions, such as the virtual focus position, the virtual f-stop, and the virtual zoom magnification, supplied from the operation unit 105. These selection conditions are set by a user via the focus adjustment ring 314, the aperture adjustment ring 315, and the zoom adjustment ring 313 as in the second embodiment.

At step 2604, the image selection unit 1503 refers to the selection conditions supplied from the selection condition acquisition unit 1504 and select a preferred captured image that meets the selection conditions from the plurality of pieces of captured image data stored in the memory unit 1502. The data of the selected captured image is sent to the display unit 106 and displayed on the display unit 106.

At step 2605, the image processing unit 112 determines whether or not there is a new input about the selection conditions (instructions to change). In the case where it is determined that there are instructions to change the selection conditions, the procedure returns to step 2603 and the processing at step 2603 and step 2604 is performed repeatedly in accordance with the selection conditions newly input. On the other hand, in the case where it is determined that there are no instructions to change the selection conditions, this processing is exited.

As explained above, according to the invention of the present embodiment, it is made possible to display the image whose focus position, etc., is changed by using a plurality of pieces of captured image data obtained by the bracket image capturing without performing image combination processing.

Fifth Embodiment

The first to fourth embodiments premise the presence of the image capturing device in which the image capturing unit configured to acquire captured image data, the image processing unit configured to perform image combination processing, and the display unit configured to display a combined image are all integrated into one unit. Next, an aspect is explained as a fifth embodiment, in which the image processing unit, the display unit, and the image capturing unit are not integrated into one unit.

The image combination processing itself in the image processing unit is the same as that in the first embodiment, etc., and therefore, explanation thereof is omitted. Further, that the parameters (the virtual focus position, the virtual f-stop, the virtual zoom magnification, etc.) necessary for image combination are set by a user via the operation unit (the focus adjustment ring, the aperture adjustment ring, the zoom adjustment ring, etc.) used at the time of image capturing is the same as that in the first embodiment, etc.

Figure 27A:
FIGS. 27A to 27C are diagrams for explaining three kinds of aspects in which an image processing unit and/or a display unit exists separately from an image capturing unit.
Figure 27B:
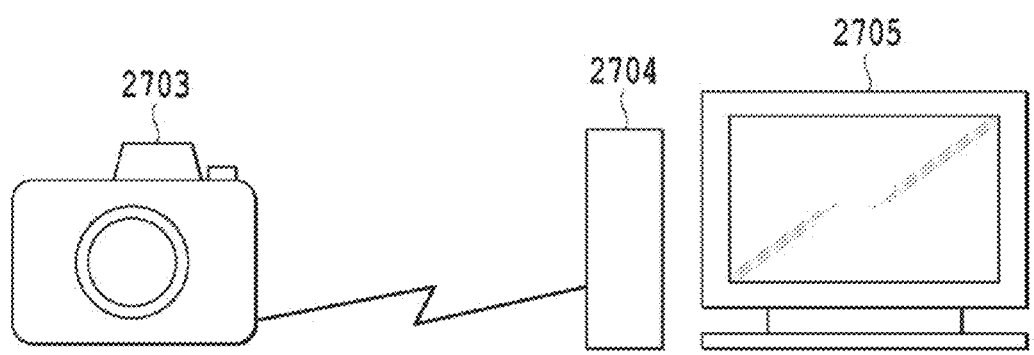
Figure 27C:
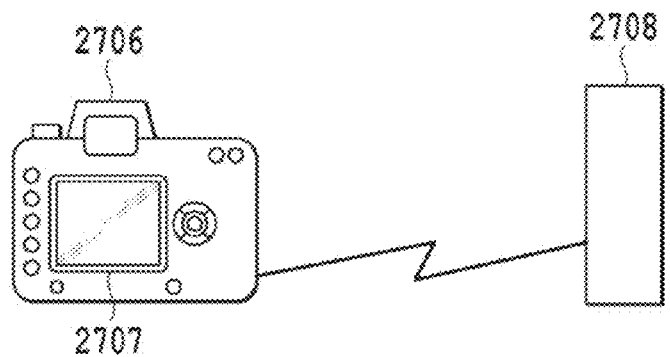

FIGS. 27A to 27C are diagrams for explaining three kinds of aspects in which the image processing unit and/or the display unit exists separately from the image capturing unit.

FIG. 27A is an aspect in which the image capturing unit and the image processing unit are integrated into one unit and the monitor as a display unit exists separately. The data of an image captured by an image capturing device 2701 is subjected to processing in the image processing unit (not shown schematically) included inside the image capturing device 2701 and a combined image is generated, and the generated combined image data is sent to a monitor 2702 as a display unit and displayed thereon.

FIG. 27B is an aspect in which the image capturing unit, the image processing unit, and the display unit exist separately from one another. The data of an image captured by an image capturing device 2703 is transferred to a PC 2704 as an image processing unit and image combination processing is performed in the PC 2704. Then, the generated combined image data is sent to a monitor 2705 as a display unit and displayed thereon. In the case where captured image data is acquired by the bracket image capturing as in the fourth embodiment, it is sufficient for the PC 2704 as an image processing unit only to retain the captured image data and to select an image without performing image combination processing.

FIG. 27C is an aspect in which the image capturing unit and the display unit are integrated into one unit and a PC as an image processing unit exists separately. The data of an image captured by an image capturing device 2706 is transferred to a PC 2708 as an image processing unit and image combination processing is performed in the PC 2708. Then, the generated combined image data is sent to the image capturing device 2706 having a liquid crystal monitor 2707 as a display unit and displayed thereon.

In FIGS. 27A to 27C, data transmission between the image capturing device and the display unit, between the image capturing device and the image processing unit, and between the image processing unit and the display unit is realized by wired connection by which both units are connected by, for example, a cable. Of course, it may also be possible to realize the data transmission by utilizing wireless connection, such as Wi-Fi and Bluetooth (registered trademark).

In FIGS. 27B and 27C, the image capturing device that acquires captured image data to be subjected to image combination processing is not necessarily the same as the image capturing device used to input image combination parameters. It may also be possible to perform image combination processing on data of an image captured by an image capturing device different from the image capturing device used to input image combination parameters. In this case, it is sufficient for a PC as an image processing unit to, for example, store image capturing parameters of the image capturing device used for image capturing in the memory unit in advance.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-179849, filed Aug. 14, 2012, which is hereby incorporated by reference herein in its entirety.

What is claimed is:

1. An image capturing device comprising:
   an image capturing unit configured to perform image capturing by forming an image of a subject with an optical system;
   an operation unit configured to set an image capturing parameter including at least one of a focus position, an f-stop, and a zoom magnification in performing the image capturing with the image capturing unit;
   an acquiring unit configured to acquire, by using the image capturing parameter set by the operation unit, a plurality of image data captured by the image capturing unit;
   a setting unit configured to set, based on an input from a user operating the operation unit after the plurality of image data are captured, a combination parameter used for combining the plurality of image data acquired by the acquiring unit; and
   a combining unit configured to combine the plurality of image data by using the combination parameter set by the setting unit to generate combined image data.

2. The image capturing device according to claim 1, wherein the combined image data is image data corresponding to an image capturing parameter different from the image capturing parameter used for capturing the plurality of image data.

3. The image capturing device according to claim 1, wherein
   the operation unit includes a focus adjustment ring for setting a focus position in performing image capturing with the image capturing unit, the focus adjustment ring being included in a lens barrel of the optical system; and
   the setting unit sets, based on the input from the user operating the focus adjustment ring after the plurality of image data are captured, a virtual focus position to be focused in the combined image data.

4. The image capturing device according to claim 1, wherein
   the operation unit includes an aperture adjustment ring for setting an f-stop in performing image capturing with the image capturing unit, the aperture adjustment ring being included in a lens barrel of the optical system; and
   the setting unit sets, based on the input from the user operating the aperture adjustment ring after capturing the plurality of image data, a virtual f-stop corresponding to a depth of field in the combined image data.

5. The image capturing device according to claim 1, wherein
   the operation unit includes a zoom adjustment ring for setting a zoom magnification in performing image capturing with the image capturing unit, the zoom adjustment ring being included in a lens barrel of the optical system; and
   the setting unit sets, based on the input from the user operating the zoom adjustment ring after the plurality of image data are captured, a virtual zoom magnification corresponding to a viewing angle in the combined image data.

6. The image capturing device according to claim 1, wherein the operation unit corresponds to an electronic dial.

7. The image capturing device according to claim 1, wherein the plurality of image data are image data of one subject captured from a plurality of different viewpoints.

8. The image capturing device according to claim 1, further comprising a posture acquiring unit for acquiring posture information indicating a posture of the image capturing device, wherein an inclination of a virtual focus plane to focus in the combined image data is changed by the combining unit in accordance with the posture information.

9. An image processing device connected to an image capturing device, the image capturing device having:
   an image capturing unit for performing image capturing by forming an image of a subject with an optical system; and
   an operation unit for setting, by operation thereof, an image capturing parameter including at least one of a focus position, an f-stop, and a zoom magnification in performing the image capturing with the image capturing unit,
   the image processing device comprising:
      an acquiring unit configured to acquire, by using the image capturing parameter set in the operation of the operation unit, a plurality of image data captured by the image capturing unit;
      a setting unit configured to set, based on an input from a user operating the operation unit after the plurality of image data are captured, a combination parameter used for combining the plurality of image data acquired by the acquiring unit; and
      a combining unit configured to combine the plurality of image data by using the combination parameter set by the setting unit to generate combined image data.

10. An image processing method performed by an image processing device connected to an image capturing device, the image capturing device having:
   an image capturing unit for performing image capturing by forming an image of a subject with an optical system; and
   an operation unit for setting, by operation thereof, an image capturing parameter including at least one of a focus position, an f-stop, and a zoom magnification in performing the image capturing with the image capturing unit,
   the method comprising:
      acquiring, via use of the image capturing parameter set in the operation of the operation unit, a plurality of image data captured by the image capturing device;
      setting, based on an input from a user operating the operation unit after the plurality of image data are captured, a combination parameter used for combining the plurality of image data acquired in the acquiring step; and
      combining the plurality of image data by using the combination parameter set in the setting step to generate combined image data.

11. A non-transitory computer readable storage medium storing a program for causing a computer to perform an image processing method with an image processing device connected to an image capturing device, the image capturing device having:
   an image capturing unit for performing image capturing by forming an image of a subject with an optical system; and
   an operation unit for setting, by operation thereof, an image capturing parameter including at least one of a focus position, an f-stop, and a zoom magnification in performing the image capturing with the image capturing unit,
   the method comprising:
      acquiring, via use of the image capturing parameter set in the operation of the operation unit, a plurality of image data captured by the image capturing device;
      setting, based on an input from a user operating the operation unit after the plurality of image data are captured, a combination parameter used for combining the plurality of image data acquired in the acquiring step; and
      combining the plurality of image data by using the combination parameter set in the setting step to generate combined image data.

* * * * *